United States Patent
Hasegawa

(10) Patent No.: US 7,148,891 B2
(45) Date of Patent: Dec. 12, 2006

(54) IMAGE DISPLAY METHOD AND IMAGE DISPLAY DEVICE

(75) Inventor: Hiroshi Hasegawa, Chiro (JP)

(73) Assignee: Seiko Epson Corporation, Tokyo (JP)

( * ) Notice: Subject to any disclaimer, the term of this patent is extended or adjusted under 35 U.S.C. 154(b) by 342 days.

(21) Appl. No.: 10/668,303

(22) Filed: Sep. 24, 2003

(65) Prior Publication Data

US 2004/0119708 A1    Jun. 24, 2004

(30) Foreign Application Priority Data

Sep. 24, 2002 (JP) ............................. 2002-277965

(51) Int. Cl.
*G06T 15/00*     (2006.01)
*G06T 15/20*     (2006.01)

(52) U.S. Cl. .................................... 345/427

(58) Field of Classification Search .................. 345/427
See application file for complete search history.

(56) References Cited

U.S. PATENT DOCUMENTS

| | | | |
|---|---|---|---|
| 4,475,126 A | 10/1984 | Akins | |
| 5,818,420 A | 10/1998 | Mitsumine et al. | |
| 5,963,247 A * | 10/1999 | Banitt | 348/121 |
| 6,020,890 A * | 2/2000 | Kohda | 345/419 |
| 6,313,867 B1 | 11/2001 | Shimakawa | |
| 6,710,775 B1 * | 3/2004 | Tulman | 345/473 |
| 2002/0186217 A1* | 12/2002 | Kamata et al. | 345/427 |

FOREIGN PATENT DOCUMENTS

| | | |
|---|---|---|
| CN | 1220738 A | 6/1999 |
| JP | A 7-253773 | 10/1995 |
| JP | B2 2806909 | 7/1998 |

* cited by examiner

*Primary Examiner*—Mark Zimmerman
*Assistant Examiner*—Andrew Yang
(74) *Attorney, Agent, or Firm*—Oliff & Berridge, PLC

(57) ABSTRACT

An image is displayed on a small display unit having a wide viewing angle range and a cubic effect providing actuality and reality thereto. An image is displayed on a plurality of display surfaces which are inner surfaces of a display unit. The present invention calculates which image will be displayed on each display surface when viewing from a specific viewpoint, and the obtained images are displayed on each display surface. For example, when a 3 DCG image is displayed on two adjacent display surfaces of the plurality of display surfaces, the image is divided corresponding to the display surfaces, and the divided images are generated on the display surfaces by using a perspective method having one vanishing point.

18 Claims, 24 Drawing Sheets

IMAGE DISPLAY METHOD AND IMAGE DISPLAY DEVICE

BACKGROUND OF THE INVENTION

1. Field of Invention

The present invention relates to an image display method and an image display device capable of displaying real images or computer graphic images by providing a sense of actuality or reality thereto.

2. Description of Related Art

A wide viewing angle range must be obtained to display realistic images. The size of a display screen must increase to display realistic images when using related art image display devices having a cathode ray tube (hereinafter "CRT") display screens or liquid crystal display screens, and more particularly, an image display device to display the images by projecting them on a projection surface of a projector. As a result, the price of the image display device increases, a large space is required for projecting images, and power consumption increases due to the wide viewing angle range.

In addition, when three-dimensional image data, such as computer graphic images are displayed on a two-dimensional plane display screen, they are generally displayed by using various projection methods, such as oblique projection, isometric projection and one-, two- or three-point perspective methods. However, these methods have various defects. For example, the displayed images are unnatural because the three-dimensional images are displayed on the two-dimensional display screen.

The related art also includes methods of displaying images on a plurality of surfaces to display realistic images. For example, Japanese Unexamined Patent Application Publication No. 7-253773 discloses a three-dimensional display device.

This related art method displays images on outer surfaces of a polyhedron, for example, a cube, namely it displays images by detecting viewpoints of a user, calculates how an object will be viewed from each viewpoint.

Accordingly, the images can be displayed with reality as if the user saw the object in various angles. That is, more realistic and actual images can be displayed.

SUMMARY OF THE INVENTION

However, the related art must detect viewpoints of a user and calculate images from each viewpoint in real time. As a result, there are problems in that operations are complicated, and an operation device having high processing capability is required.

In addition, in the related art, the images are seen from the viewpoints of the user as if an object existed in a certain size cube. Since the images are displayed on each outer surface of the cube, a size of the viewing angle range is restricted by a size of the cube. If the cube is excessively enlarged to make the viewing angle range wider, the surfaces of the cube are so large that the user can see only one surface. This means that characteristics of the three-dimensional image display device, including a polyhedron, are lost.

The present invention provides an image display method and image display device capable of obtaining a wide viewing angle range and a cubic effect, the display images are realistic, and naturally display real images as well as 3 DCG images even using a small screen.

In order to address or achieve the above, the present invention provides an image display method to display images on a plurality of display surfaces by using a plurality of inner surfaces of a polyhedron as the display surfaces, the image display method comprising: calculating how images are displayed on each of the display surfaces when viewing the images to be displayed from a specific viewpoint; and displaying the calculated images on each of the display surfaces.

According to the image display method, in the calculating of how the images are displayed on each of the display surfaces when viewing the images to be displayed from the specific viewpoint, if the images to be displayed are real images, then transforming the real images projected on a two-dimensional display surface onto at least two adjacent display surfaces of the plurality of display surfaces forming the polyhedron.

According to the image display method, in the calculating of how the images are displayed on each of the display surfaces when viewing the images to be displayed from the specific viewpoint, generating three-dimensional computer graphic images, by dividing the three-dimensional computer graphic images in accordance with the at least two adjacent display surfaces of the plurality of display surfaces forming the polyhedron; and displaying the divided image data by using a perspective method having one vanishing point for each display surface.

According to the image display method, the at least two adjacent display surfaces of the plurality of surfaces forming the polyhedron are orthogonal to each other.

According to the image display method, the at least two adjacent display surfaces, which are orthogonal to each other, include a combination of vertical display surfaces and horizontal display surfaces.

According to the image display method, the displaying of the images on the plurality of display surfaces, uses as display screens, image display screens of an image display device having an image display function, and displays the images on the plurality of display surfaces using the image display screens of the image display device.

According to the image display method, the displaying the images on the plurality of display surfaces uses at least one image display device for projecting the images on image projection surfaces, and displays the images on the plurality of display surfaces by the at least one image display device, the image display device using the display surfaces as the image projection surfaces.

According to the image display method, forming the polyhedron in a box shape, the inner surfaces of the box are used as the display surfaces, and forming an inner viewing window, to view the inside of the box, in the box, and the specific viewpoint is set in the inner viewing window.

An image display device according to the present invention is an image display device to display images on a plurality of display surfaces by using a plurality of inner surfaces of a polyhedron as the display surfaces, the image display device including: an image processing device to calculate how images are displayed on each of the display surfaces when viewing the images to be displayed from a specific viewpoint; and image display device to display the images obtained by the image processing device on each of the display surfaces.

According to the image display device, if the images to be displayed are real images, the image processing device transforming the real images projected on a two-dimensional display surface onto at least two adjacent display surfaces of the plurality of display surfaces forming the polyhedron.

According to the image display device, if the images are three-dimensional computer graphic images, the image processing device dividing the three-dimensional computer graphic images in accordance with the at least two adjacent display surfaces of the plurality of display surfaces forming the polyhedron, and generating images to display the divided image data by using a perspective method having one vanishing point on each display surface.

According to the image display device, at least two adjacent display surfaces of the plurality of surfaces forming the polyhedron are orthogonal to each other.

According to the image display device, the at least two adjacent display surfaces orthogonal to each other comprise combinations of vertical display surfaces and horizontal display surfaces.

According to the image display device, the images are displayed on the plurality of display surfaces by image display screens of the image display device and the image display screens of the image display device having an image display function are used as display screens.

According to the image display device, the images are displayed on the plurality of the display surfaces by using at least one image display device, and the at least one image display device projecting the images on image projection surfaces by using the display surfaces as the image projection surfaces.

According to the image display device, the polyhedron is formed in a box shape, the inner surfaces of the box are used as the display surfaces, an inner viewing window to view the inside of the box is formed in the box, and a specific viewpoint is set in the inner viewing window.

The present invention provides an image display method to display images on the plurality of display surfaces which are inner surfaces of the polyhedron, calculates how the images will be displayed on each display surface when seen from the specific viewpoint, and displays the obtained images on each display surface. Therefore, a wide viewing angle range and a cubic effect can be obtained even on small display surfaces, and the images can be realistically displayed and consistently connected to each other on each display surface.

In accordance with the present invention, the real images such as DVD can be realistically displayed by obtaining a wide viewing angle range and a cubic effect on small display surfaces. In addition, three-dimensional computer graphic images can be displayed on small display surfaces with natural vanishing points like a real object. They can be also displayed with a wide viewing angle range and a cubic effect. Even if the viewpoint of the user changes, the images is displayed with natural perspective without revealing any incongruity.

At least two adjacent display surfaces of the plurality of display surfaces of the polyhedron are orthogonal to each other.

In detail, the images are displayed by fully using a space which is not basically suitable for image display. For example, a corner of a room whose indoor walls are orthogonal to each other, or at least two adjacent orthogonal inner walls of a box. Here, at least two display surfaces orthogonal to each other include combinations of vertical display surfaces and horizontal display surfaces.

Accordingly, realistic images are displayed on small display surfaces by obtaining a wide viewing angle range and a cubic effect. For example, when the images are displayed by using a plurality of adjacent walls of a small room, a person inside the room sees the cubic images on the walls with a viewing angle range from a specific viewpoint. Thus, he/she feels like being in a real space.

In order to display the images on the plurality of display surfaces, display screens of image display devices (for example, liquid crystal display device or CRT display device) having an image display function are used as display screens. Accordingly, the images can be displayed on the plurality of display surfaces by using the display screens of the image display devices without requiring a special projection device.

As a result, the images can be displayed in a narrow space in which a portable box or a projector cannot be provided.

In addition, in order to display the images on the plurality of display surfaces, image projection surfaces are used as display surfaces, and at least one image projection device for projecting the images on the image projection surfaces is used. That is, the images are displayed on the plurality of display surfaces by at least one image projection device. Accordingly, the images can be displayed in a wider space, which is suitable for a store advertisement. Moreover, the images can be displayed on a plurality of display surfaces by using one projection device. The projection devices can also be provided respectively on the corresponding display surfaces.

When the images are displayed on the plurality of display surfaces by using one projection device, they must be processed in considering distortion. Nevertheless, using one projection device is very advantageous in view of cost of equipment. On the other hand, when a plurality of projection devices are used, the cost of equipment increases. However, the image processing relating to distortion is not required, which simplifies the process.

The polyhedron is formed in a box shape. The inner surfaces of the box are used as display surfaces. An inner viewing window for viewing the inside of the box is provided in the box. The specific viewpoint is set on the inner viewing window. Accordingly, the user can see the inner display surfaces from the specific viewpoint through the inner viewing window. If the box is portable such that the user can carry the box and sees the inside of the box from a predetermined time, he/she can see the cubic images at a wide viewing angle range. Therefore, the user feels like being in a real space. Various applications of the image display device such as a portable game set are expected.

DETAILED DESCRIPTION OF PREFERRED EMBODIMENTS

Exemplary embodiments of the present invention are explained below. These exemplary embodiments include explanations of both the image display method and image display device.

In accordance with the present invention, images are displayed on a plurality of display surfaces which are inner surfaces of a polyhedron. A computer calculates how the images will be displayed on each display surface when seen from a specific viewpoint. Thus, it is possible to display the obtained images on each display surface with a wide viewing angle range, a cubic effect, actuality, and reality.

A first embodiment shows a case of displaying real images stored in for example, DVDs (Digital Video Disc), and a second embodiment shows a case of displaying three-dimensional computer graphic (hereinafter "3 DCG") images.

Figure 1:
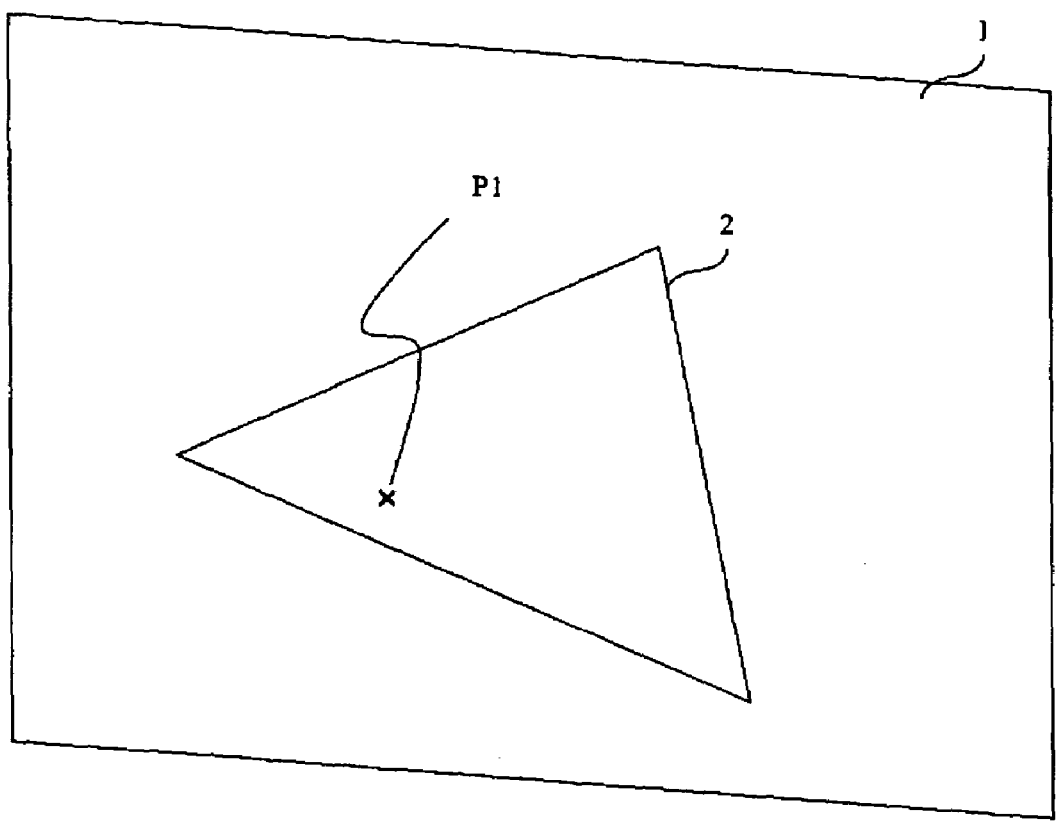
FIG. 1 is a schematic illustrating a state where real images are displayed on a screen in accordance with a first exemplary embodiment of the present invention.

First, display of the real images are described below. FIG. 1 is a schematic illustrating a state an image 2 (herein, the image is a triangle) displayed on a large plane screen 1. Herein, the image 2 displayed on the screen 1 is seen from a viewpoint P1 indicating the image 2 as 'x' (P1 is positioned away from the surface of the screen 1 at a certain distance).

A case that the same view as that of seeing the image 2 displayed on the screen 1 from the viewpoint P1 is applied to a small display unit will now be described. In the first exemplary embodiment, a display unit (a display unit including three orthogonal display surfaces) 10 of a polyhedron is used as a small display unit.

Figure 2:
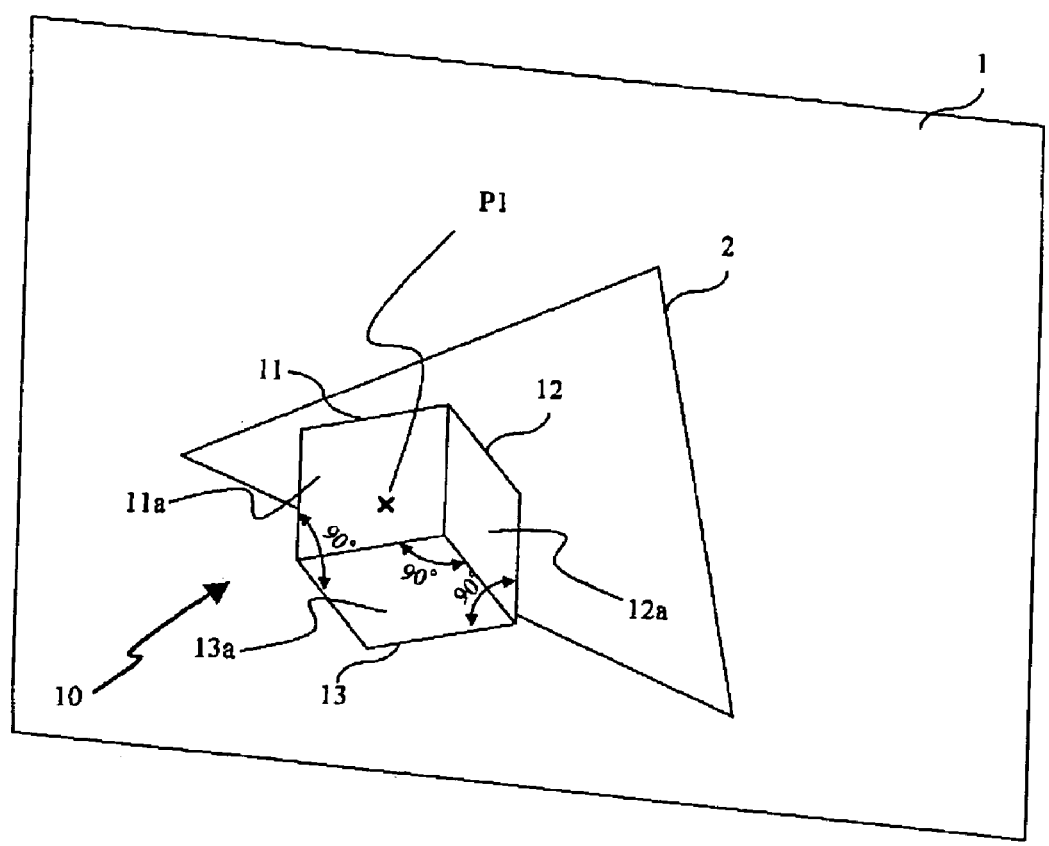
FIG. 2 is a schematic illustrating a state of a display unit having three orthogonal display surfaces overlapping each other on the screen of FIG. 1.

As illustrated in FIG. 2, the display unit 10 includes three orthogonal display surfaces with two orthogonal squares 11 and 12 forming vertical surfaces, and one square 13 being provided at the lower end of the two squares and forming a horizontal plane. Inner surfaces 11a, 12a, and 13a of the squares 11, 12, and 13 are used as display surfaces (hereinafter "display surfaces 11a, 12a, and 13a").

The image 2 is displayed on the display surfaces 11a, 12a, and 13a of the display unit 10 so that the image 2 is seen as the image 2 displayed on the screen 1 from the viewpoint P1 of FIG. 1. In addition, projection surfaces, such as screens, or image display surfaces of image display devices having an image display function (for example, a liquid crystal display device, a CRT display device, etc.) can be used as the display surfaces 11a, 12a, and 13a.

The technique of displaying the image 2 on the display unit 10 as the image 2 displayed on the screen 1 from the viewpoint P1 of FIG. 1 can be accomplished by using general image transformation techniques such as texture mapping or ray tracing.

Figure 3:
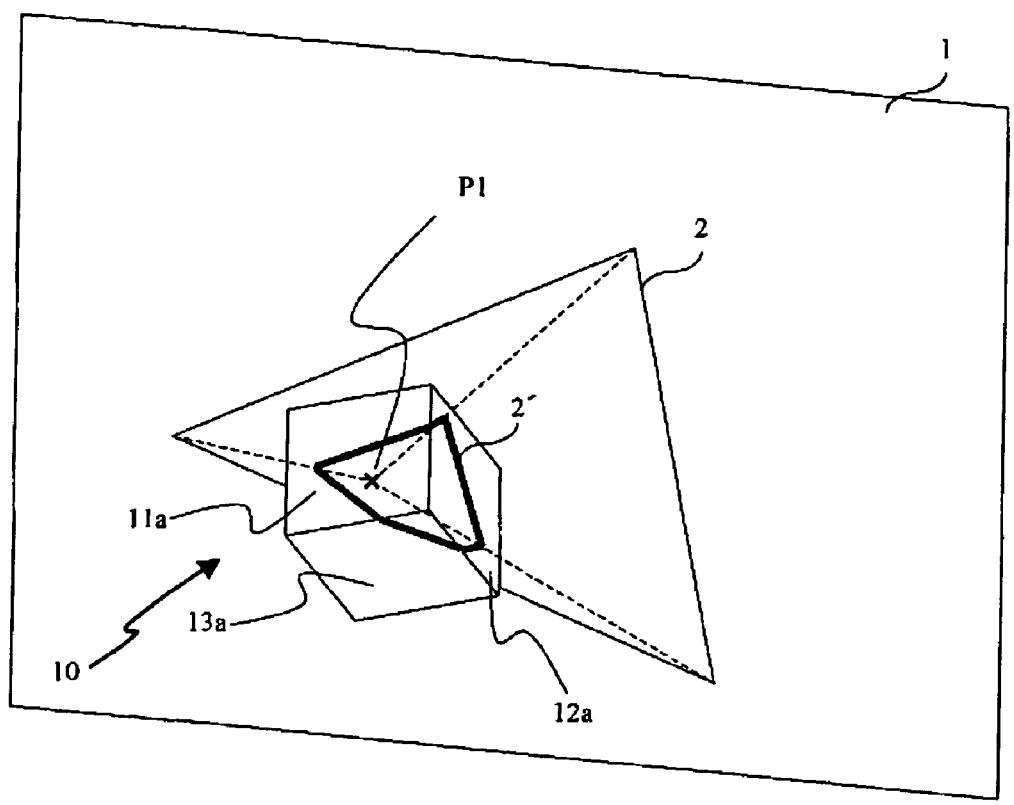
FIG. 3 is a schematic illustrating a state where the images displayed on the screen when seen from a specific viewpoint are mapped to the three orthogonal display surfaces.

FIG. 3 is an exemplary schematic illustrating mapping of the image 2, displayed on the back large screen 1, to the small display unit 10 positioned in front of the screen 1, when the user sees the image 2 from the viewpoint P1. Briefly, the viewpoint P1 is connected to each apex of the triangle image 2 on the screen 1 (FIG. 3 shows a line connecting the three fixed points of the triangle image to the viewpoint P1 as a dotted line). Intersection points with the display surfaces 11a, 12a, and 13a of the display unit 10 are calculated, and image data of each intersection point is calculated to obtain images to be displayed on the display unit 10.

As described above, the image can be displayed on the small display unit 10 to have a viewing angle range identical to the large screen 1 when seen from the viewpoint P1, by transforming the image from the large screen 1 to the front small display unit 10.

Figure 4:
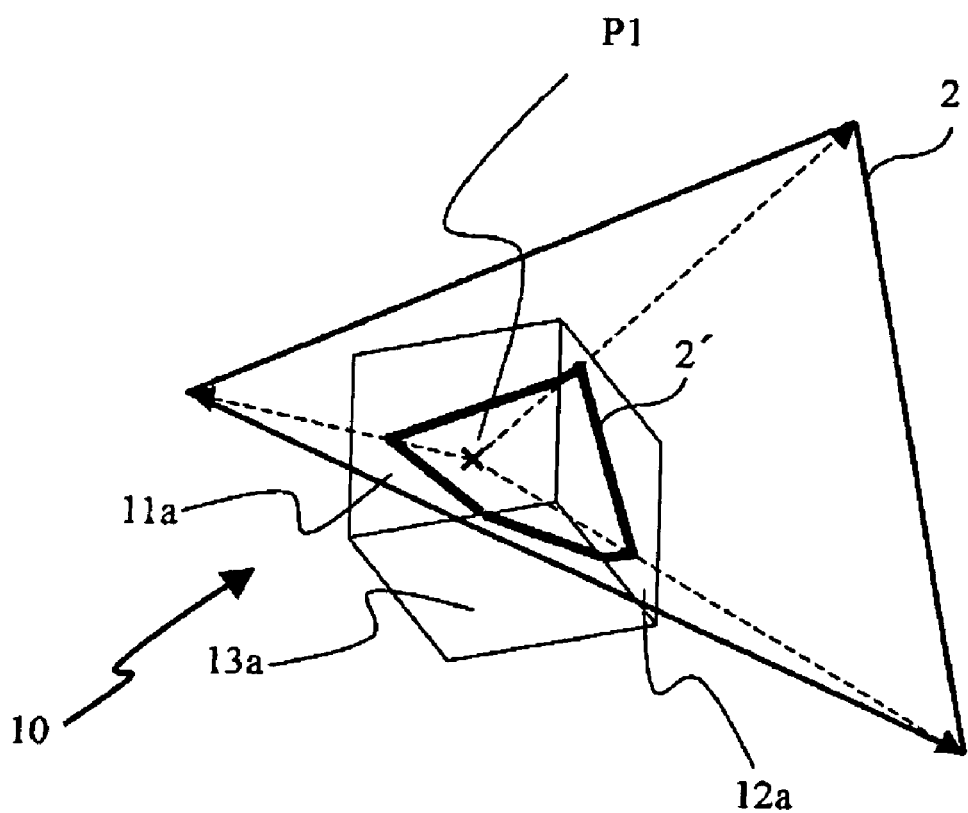
FIG. 4 is a schematic illustrating an image view when the images mapped on the three orthogonal display surfaces of FIG. 3 are seen from the specific viewpoint.

Referring to FIG. 3, an image 2' indicated by a bold line, is the image displayed on the display unit 10. In addition, the triangle image 2 displayed on the screen 1 looks like a square due to line distortion on the boundary line between the display surfaces 11a and 13a and the boundary line between the display surfaces 12a and 13a. However, as shown in FIG. 4, when seen from the viewpoint P1, the image 2' displayed on each display surfaces 11a, 12a, and 13a, is identical to the outside triangle image on the display unit 10, namely the image 2 displayed on the screen 1.

Figure 5:
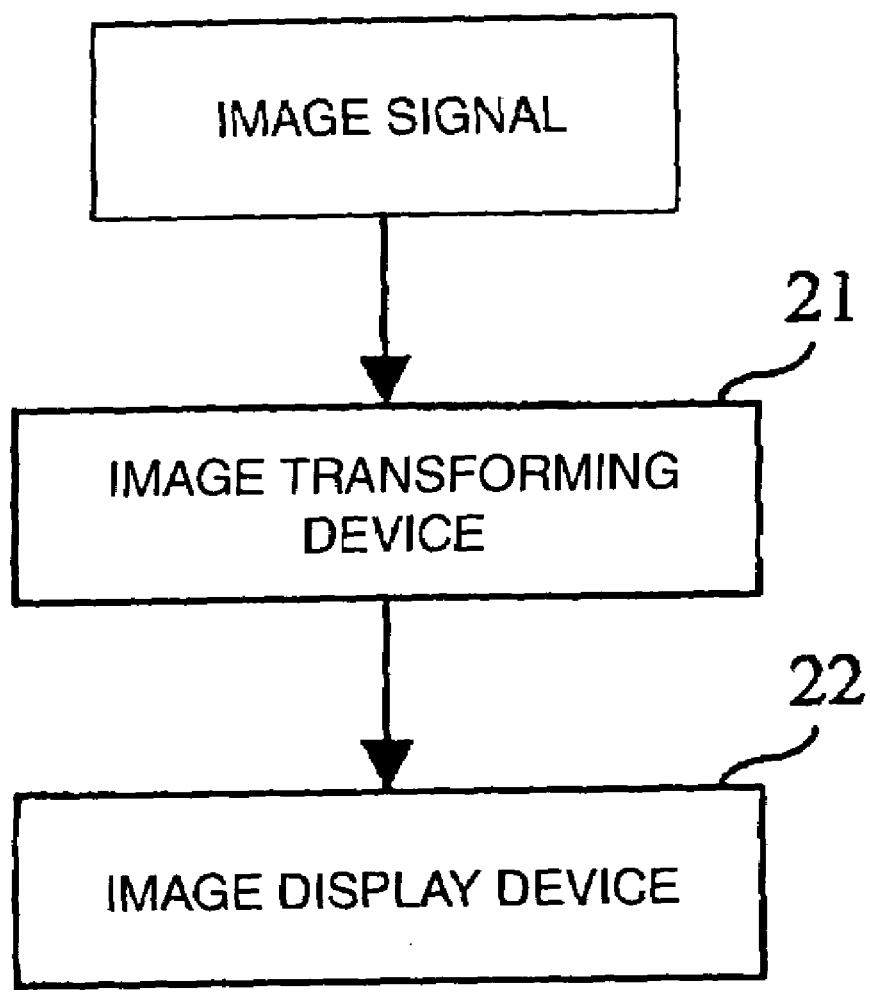
FIG. 5 is a schematic illustrating an image display device in accordance with the first exemplary embodiment of the present invention.

FIG. 5 is a schematic illustrating construction elements required for embodying the first embodiment, such as image transforming device 21 for transforming image signals which are objects to be transformed, and image display device 22 for displaying the transformed images.

The image transforming device 21 transforms an image, namely maps the image 2 displayed on the screen 1, onto each of the display surfaces 11a, 12a, and 13a of the display unit 10 so that the image 2 seen on the display unit 10, is identical to the image 2 displayed on the screen 1 from the viewpoint P1 of FIG. 1. Accordingly, the image 2 on the screen 1 of FIG. 1 is transformed into the image 2', indicated by the bold line of FIG. 4, on each of the display surfaces 11a, 12a, and 13a of the display unit 10.

The image display device 22 displays the image transformed by the image transforming device 21 onto the display surfaces 11a, 12a, and 13a. For example, when the display surfaces 11a, 12a, and 13a are screens, a projection device such as a projector is used as the image display device 22. If the display surfaces 11a, 12a, and 13a are liquid crystal screens, a liquid crystal display device is used as the image display device 22. If the display surfaces 11a, 12a, and 13a are CRT screens, a CRT display device is used as the image display device 22. That is, various image display devices can be used.

According to the first exemplary embodiment, the image 2' is transformed on the polyhedron display unit 10 using the inner surfaces of the three orthogonal squares 11, 12, and 13 as the display surfaces 11a, 12a, and 13a, so that the image 2' is identical to the image 2 displayed on the large screen 1 viewed from the predetermined viewpoint P1. When viewing the display unit 10 from the viewpoint P1, the image 2', displayed on the display unit 10, can have a wide viewing angle range like the image displayed on the large screen 1 even though the display unit 10 is small. Thus it is possible to display realistic images.

The second exemplary embodiment of realistically displaying the 3 DCG images will now be explained.

Similar to the first exemplary embodiment, the second exemplary embodiment uses the display unit 10 having the three orthogonal display surfaces 11a, 12a, and 13a.

Figure 6:
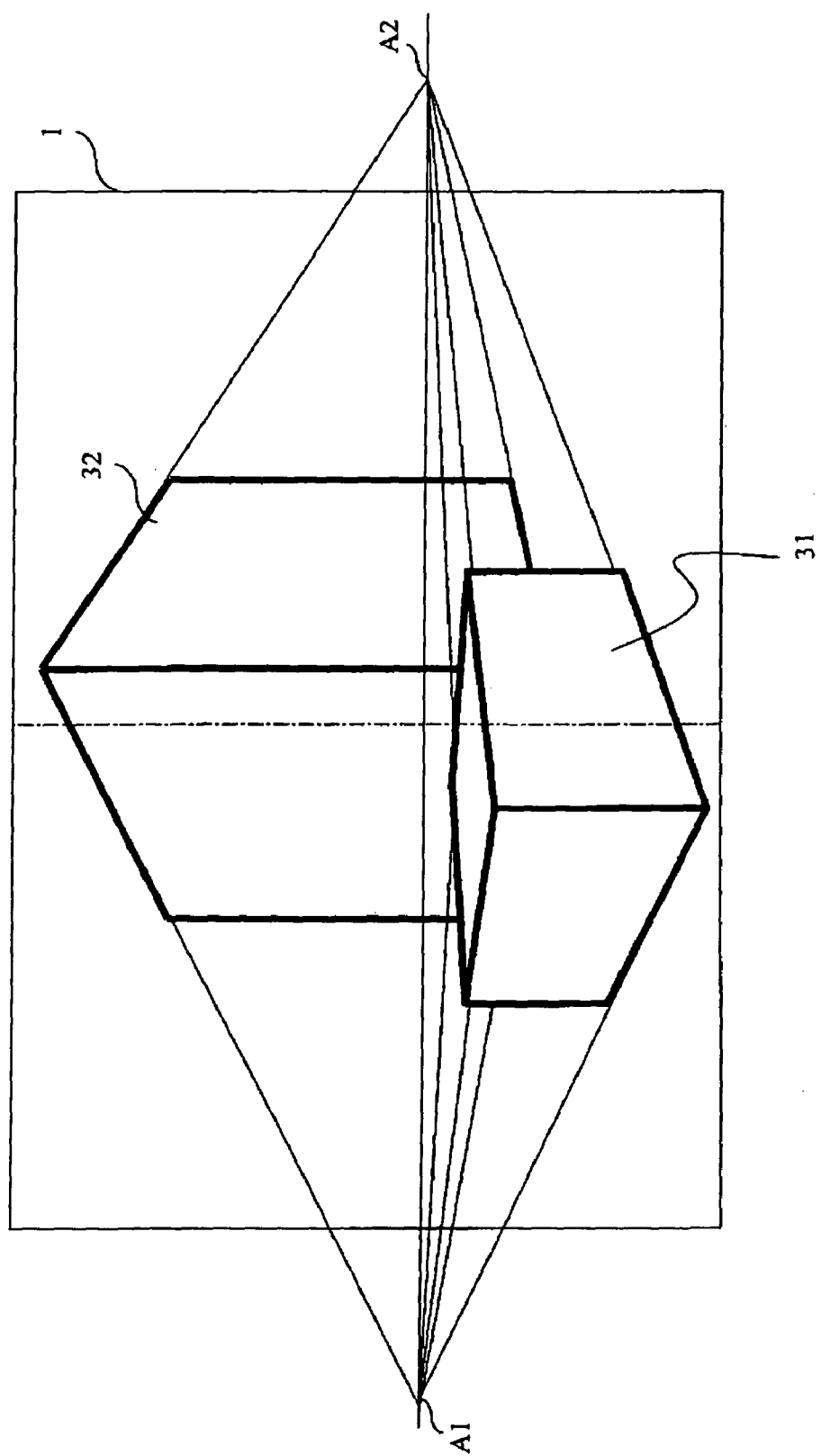
FIG. 6 is a schematic illustrating 3 DCG images used for explaining a second exemplary embodiment displayed on two-dimensional display surfaces by using a two-point perspective method.

Herein, in consideration of displaying the 3 DCG images on the display unit 10, as shown in FIG. 6, two rectangular parallelepipeds (first rectangular parallelepiped 31 and second rectangular parallelepiped 32) are displayed on one plane screen 1 according to a two-points perspective method. Vanishing points A1 and A2 exist in the right and left sides of the screen in the horizontal direction.

A processing in which such images are displayed on the display unit 10 will now be described. In the second exemplary embodiment, the images displayed on one plane screen 1 of FIG. 6, according to the two-point perspective method, can be displayed on a small display unit (display unit 10) with a wide viewing angle range and a cubic effect. Even if a viewpoint of the user changes, the images can be displayed in natural perspective without revealing any incongruity. Herein, an example where images are displayed on the two vertical display surfaces 11a and 12a of the three orthogonal display surfaces 11a, 12a, and 13a of the display unit 10 is explained.

When the images displayed on one plane screen 1 by using the two-point perspective method (refer to FIG. 6) are displayed on the small display unit 10, the following processes are performed to display the images with the wide viewing angle range, cubic effect and natural perspective without any incongruity regardless of the viewpoint of the user.

Figure 7:
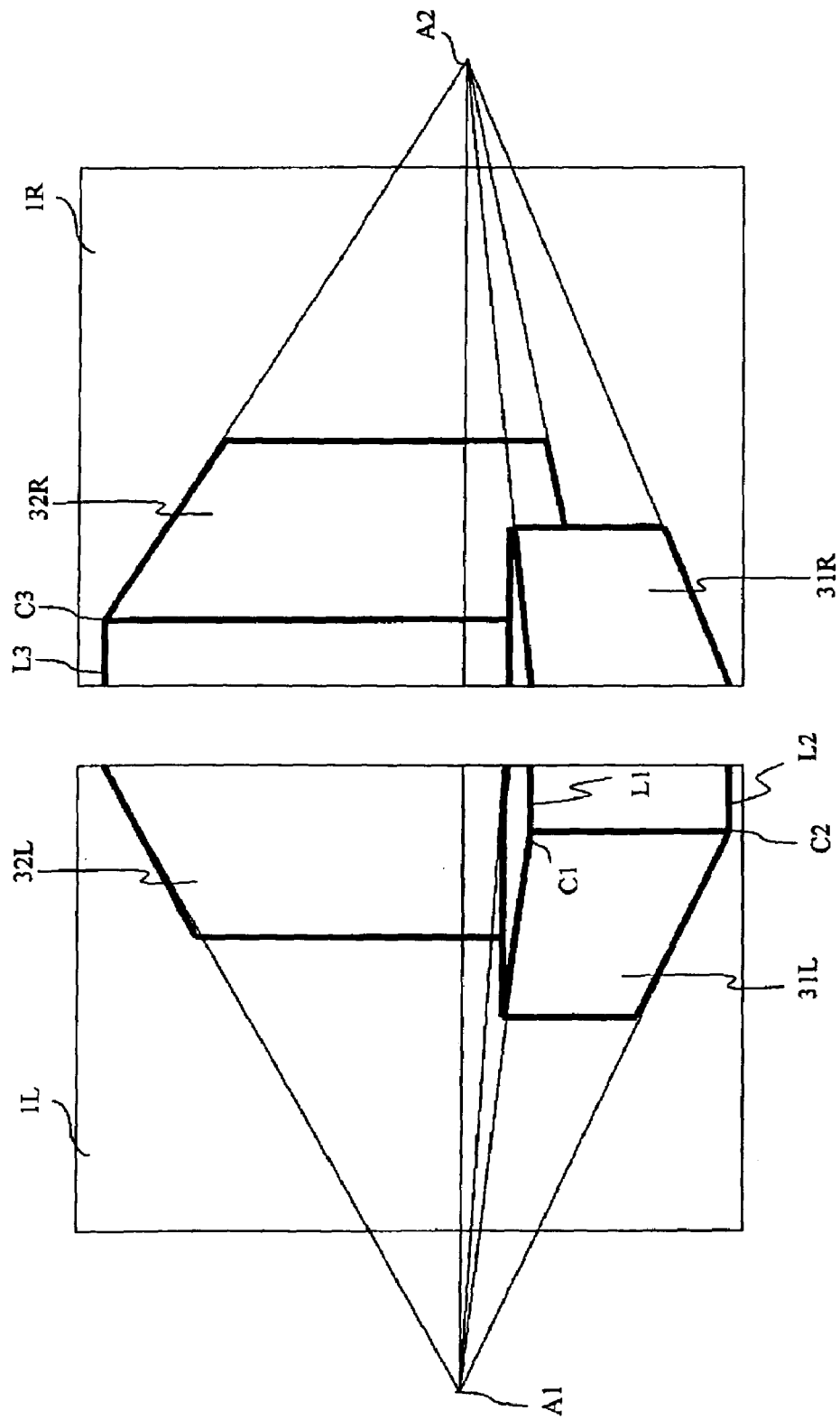
FIG. 7 is a schematic illustrating a state where the images of FIG. 6 are divided into two equal parts (along the dashed lines of FIG. 6) and the right and left side images are respectively displayed on plane surfaces by using a one-point perspective method.

FIG. 7 is a schematic illustrating a state where one plane screen 1 of FIG. 6 is divided into two equal parts in the right and left direction (along the dashed line of FIG. 6). A first rectangular parallelepiped 31L and a second rectangular parallelepiped 32L, existing on the left screen 1L, and a first rectangular parallelepiped 31R and a second rectangular parallelepiped 32R, existing on the right screen 1R, are displayed on the screens 1L and 1R by using the one-point perspective method.

Referring to FIG. 7, the first rectangular parallelepiped 31L and the second rectangular parallelepiped 32L, existing on the left screen 1L, are displayed on the display surface 11a of the display unit 10, and the first rectangular parallelepiped 31R and the second rectangular parallelepiped 32R, existing on the right screen 1R, are displayed on the display surface 11b of the display unit 10.

When the first rectangular parallelepiped 31L and the second rectangular parallelepiped 32L are displayed on the left screen 1L, by using the one-point perspective method, the second rectangular parallelepiped 32L is displayed almost identically to the left, from the dashed line of FIG. 6. But sides L1 and L2, extending from two front corner units C1 and C2 of the first rectangular parallelepiped 31L to the right direction, are displayed as lines extending in the horizontal direction, as shown in FIG. 7.

On the other hand, the first rectangular parallelepiped 31R and the second rectangular parallelepiped 32R are displayed on the left screen 1R by using the one-point perspective method. The first rectangular parallelepiped 31R has a slight difference in line gradient, but is displayed almost identically to the right side from the dashed line of FIG. 6. A side L3, extending from a corner unit C3 of the second rectangular parallelepiped 32R to the left direction, is displayed as a line extended in the horizontal direction.

As described above, the images displayed on one screen 1 of FIG. 6 by using the two-points perspective method are divided into two equal parts in the right and left direction (along the dashed line of FIG. 6). The right and left images are displayed on the right and left screens 1R and 1L by using one-point perspective method to obtain the images of FIG. 7.

Figure 8:
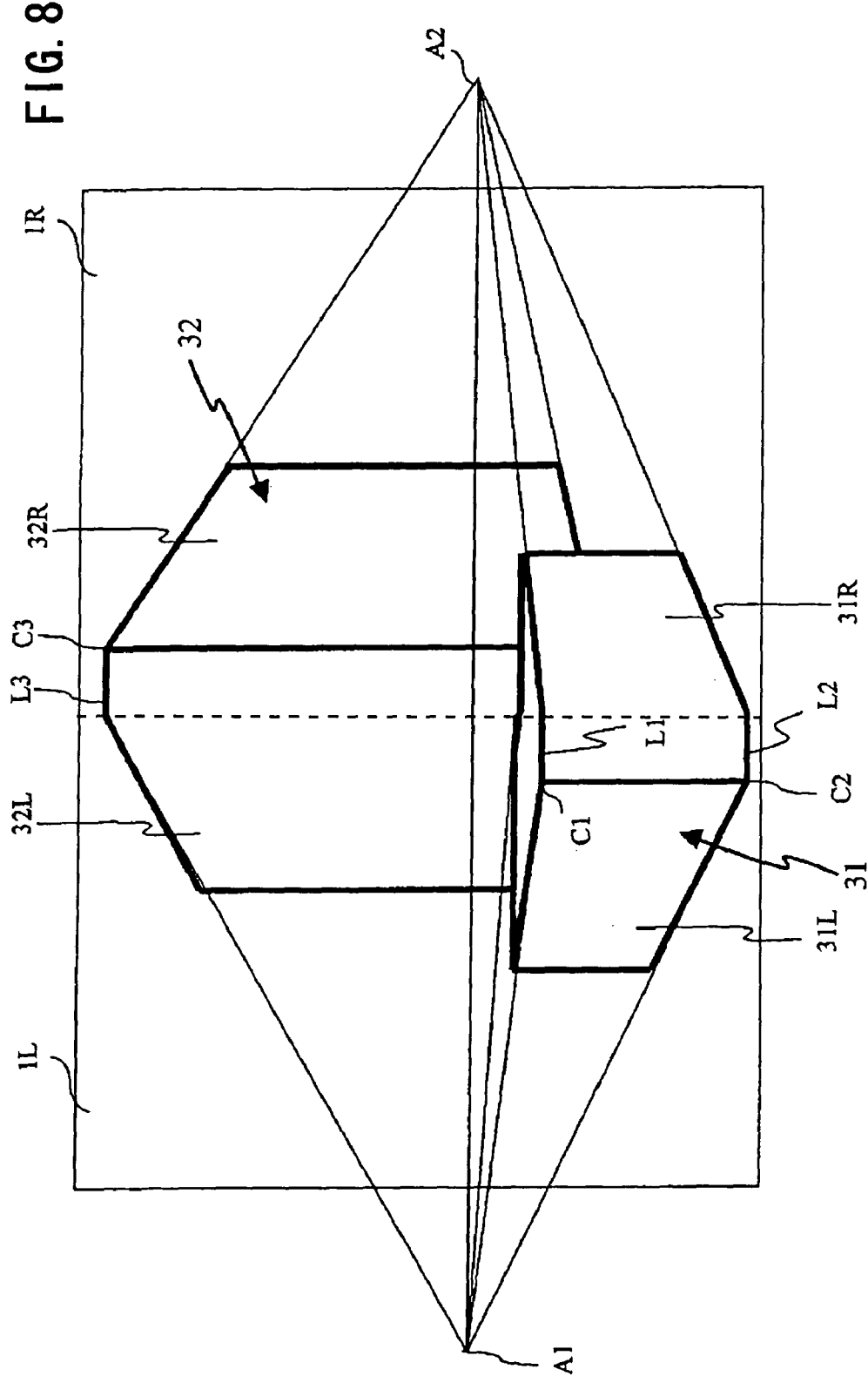
FIG. 8 is a schematic illustrating a state wherein the right and left side images of FIG. 7 are connected and displayed on one plane surface.

As illustrated in FIG. 8, the two images displayed on the right and left screens 1R and 1L of FIG. 7, by using the one-point perspective method, are simply connected and displayed on one screen 1.

At first glance, FIG. 8 shows a two-point perspective method. However, since the two images displayed by using the one-point perspective method are connected, the parts extending in the horizontal direction (parts of L1, L2 and L3) exist in the sides composed of the first rectangular parallelepiped 31 and the second rectangular parallelepiped 32 near the dotted line which is a center of the whole display surface of FIG. 8. This is incongruent in the two-point perspective method.

However, when the plane images of FIG. 8 are inwardly folded at 90 degree at the two image joints (dashed line), when the viewpoint is set on the horizontal line connecting the two vanishing points A1 and A2 and the viewpoint approaches the dashed line which is a joint of the two image joints, the images are seen from a certain viewpoint identical to the images displayed by using the two-points perspective method as shown in FIG. 6.

Accordingly, on the two orthogonal display surfaces, 11a and 12a of the display unit 10 (as explained in the first exemplary embodiment) of the polygon of the second embodiment, the image on the left screen 1L of FIG. 7 is displayed on the display surface 11a. The image on the right screen 1R of FIG. 7 is displayed on the display surface 12a. When the display surfaces 11a and 12a are seen from a certain viewpoint, the images displayed by using the two-points perspective method in FIG. 6 can be seen as shown in FIG. 9.

Figure 9:
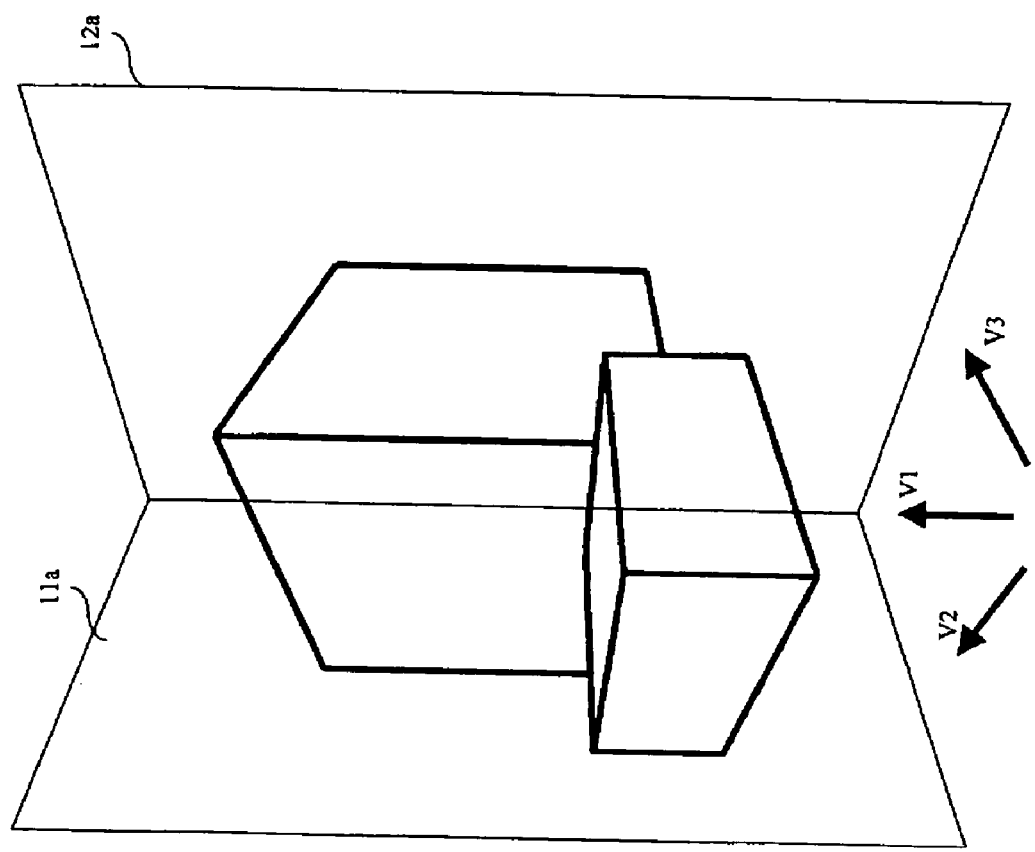
FIG. 9 is an explanatory schematic illustrating how the image is seen in a state where the plane images of FIG. 8 are inwardly folded at 90° in the connection part of the two images, and the viewpoint is set on a horizontal line connecting two vanishing points and approaching the connection part of the two images.

FIG. 9 shows the images displayed on the display surfaces 11a and 12a of the display unit 10. The left side image of FIG. 7 is displayed on the left display surface 11a, and the right side image of FIG. 7 is displayed on the right display surface 12a.

Therefore, when the images are seen in the arrow V1 direction, namely toward a kinked line of the center of the joint of the two display surfaces 11a and 12a of the display unit 10, the images are seen identical to the images displayed by using the two-points perspective method in FIG. 6. In the case where the images are seen in the arrow V2 direction, namely toward the left display surface 11a at an almost right angle, the images are seen as images displayed on the left screen 1L of FIG. 7 by using the one-point perspective method. When the images are seen in the arrow V3 direction, namely toward the right display surface 12a at an almost right angle, the images are seen as images displayed on the right screen 1R of FIG. 7 by using the one-point perspective method.

As discussed earlier, when displaying the image displayed by using the two-points perspective method in FIG. 6 on the display surfaces (two vertical orthogonal display surfaces 11a and 12a) of the display unit 10 composing the polygon, the image displayed by using the two-points perspective method in FIG. 6 is divided into two equal parts. The two divided images are respectively displayed by using the one-point perspective method (refer to FIG. 7), and then displayed on the left and right side orthogonal display surfaces 11a and 12a. In addition, a process for matching the images displayed on the display surfaces 11a and 12a is performed.

For example, as shown in FIG. 9, even though the viewpoint is toward the kinked line of the two orthogonal display surfaces 11a and 12a, to see the two entire display surfaces in the arrow V1 direction of FIG. 9, or even though the viewpoint is rotated to the right and left directions by 45 degrees from the viewpoint position to see the display surfaces 11a and 12a in the arrow V2 and V3 directions, the images having natural vanishing points like a real object can be seen. As a result, the images with the wide viewing angle range and a cubic effect can be displayed. Even if the viewpoint of the user changes, the images can be displayed with natural perspective without revealing any incongruity.

Figure 10:
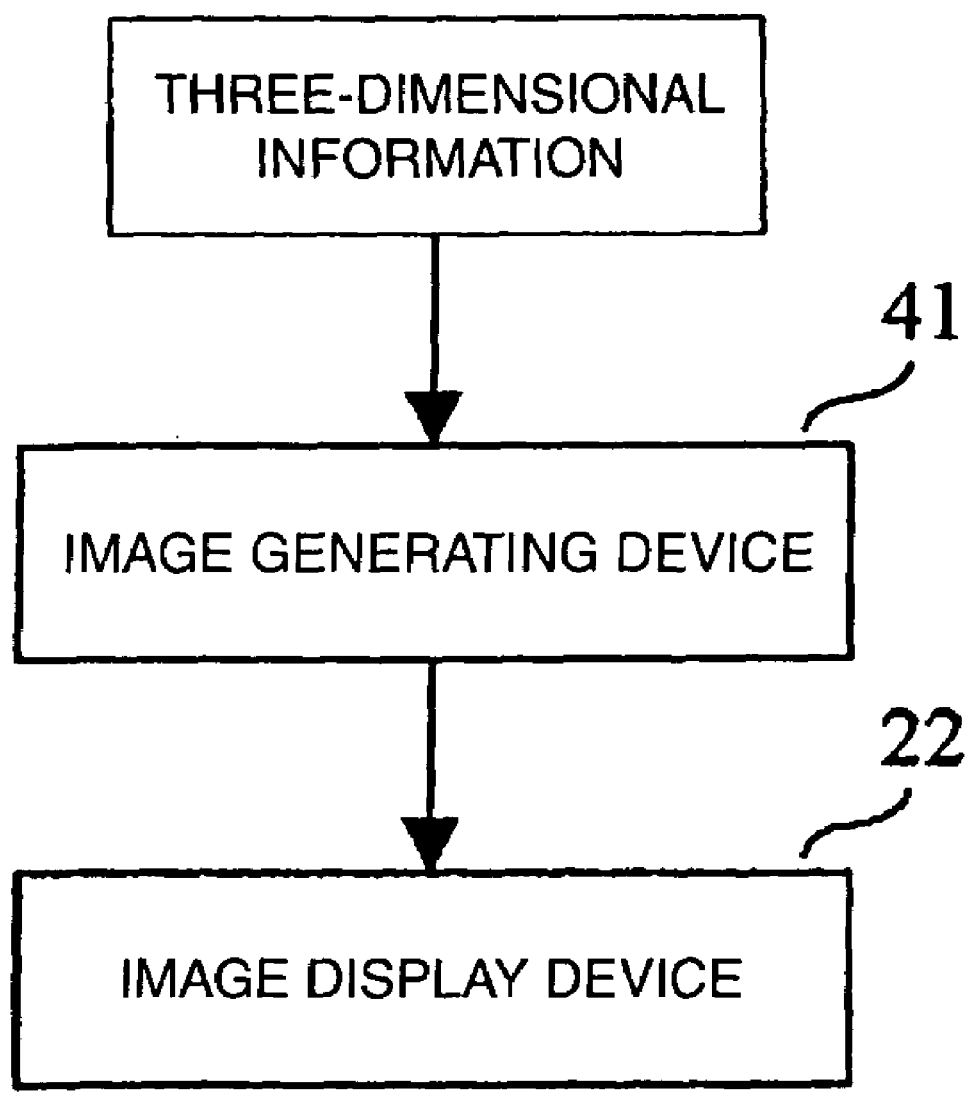
FIG. 10 is a schematic illustrating a structure of an image display device in accordance with a second exemplary embodiment of the present invention.

FIG. 10 is a schematic illustrating construction elements of the second exemplary embodiment including an image generating device 41 for determining which images will be displayed on each display surface according to three-dimensional information which is a 3 DCG image, and generating the images to be displayed on the display surfaces, and an image display device 22 for displaying the images on each display surface according to the image data generated by the image generating device 41.

In detail, the image generating device 41 divides, for example, the images displayed by using the two-points perspective method in FIG. 6, displays the images which will be displayed on the left display surface 11a and the right display surface 12a of FIG. 9 by using the one-point perspective method, and generates images matched with each other by connecting the images of the display surfaces 11a and 12a. Here, a general image generation technique can be used as an image generating method to generate two-dimensional image data from the 3 DCG images.

The image display device 22 displays the images generated by the image generating device 41 on the right and left display surfaces. For example, when the display surfaces 11a and 12a are screens, a projection device such as a projector is used as the image display device 22. When the display surfaces 11a and 12a are liquid crystal screens, a liquid crystal display device is used as the image display device 22. When the display surfaces 11a and 12a are CRT display screens, a CRT display device is used as the image display device 22. That is, the image-generating is varied depending on image display device.

The second exemplary embodiment shows applications of the present invention to the 3 DCG images. The 3 DCG image data has three-dimensional coordinates indicating which image data is stored in the computer. As explained above, the image generating device 41 calculates which image will be preferably displayed on which display surface according to the three-dimensional image data, and displays the obtained images on each display surface.

The process for displaying the real images of the DVD (the first exemplary embodiment) and the 3 DCG images (the second exemplary embodiment) on the small display unit 10 having the plurality of display surfaces with actuality or reality was explained above. The image display method will be described in detail.

Figure 11:
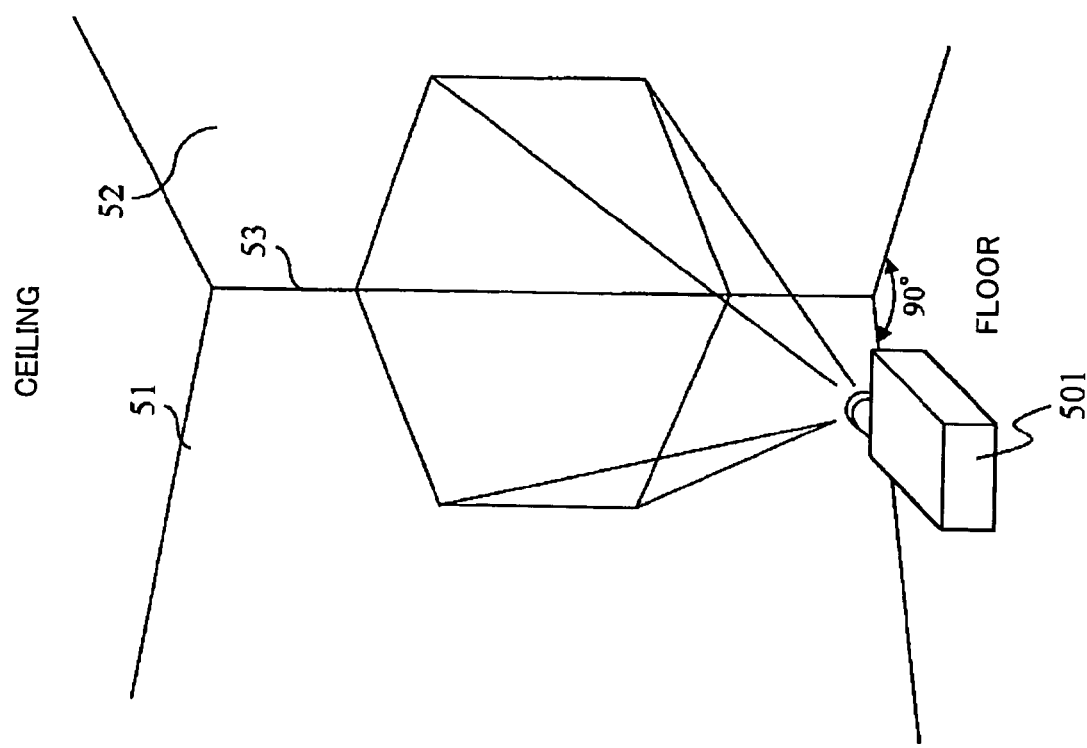
FIG. 11 is an exemplary schematic illustrating an example of projecting the images on two orthogonal inner walls by using one projector as a specific example of displaying images on the display surface of polyhedron used in the present invention.

Referring to FIG. 11, images are displayed on two orthogonal inwardly exposed walls (inner walls) 51 and 52 of the four inner walls of a conference room, by setting an orthogonal part of the inner walls 51 and 52, namely a joint 53 of the inner walls 51 and 52, as a center line of a projection screen by using one projector 501.

That is, the image displayed on the left inner wall 51 (for example, image displayed on the left display surface 11a of FIG. 9) and the image displayed on the right inner wall 52 (for example, image displayed on the right display surface 12a of FIG. 9) are generated and projected by using one projector 501.

In this case, the image displayed on the left inner wall 51 is the image displayed on the left display surface 11a of FIG. 9. The image displayed on the right inner wall 52 is the image displayed on the right display surface 12a of FIG. 9. The images are projected after adjusting their boundary line to the joint 53 of the left and right inner walls 51 and 52 by guide marking so that the projecting person can see the joint.

The image generating device 41 of FIG. 10 generates the image displayed on the left inner wall 51 and the image displayed on the right inner wall 52. In addition, when the images are projected on the two inner walls 51 and 52 forming a certain angle (for example, 90°) by using one projector as shown in FIG. 11, the images projected on the inner walls 51 and 52 are distorted to form a trapezoid. Accordingly, the image generating device 41 determines which images are suitable for the left inner wall 51 and the right inner wall 52 in consideration of the distortion. Moreover, a general image generation technique can be used as the image generation process.

Figure 12:
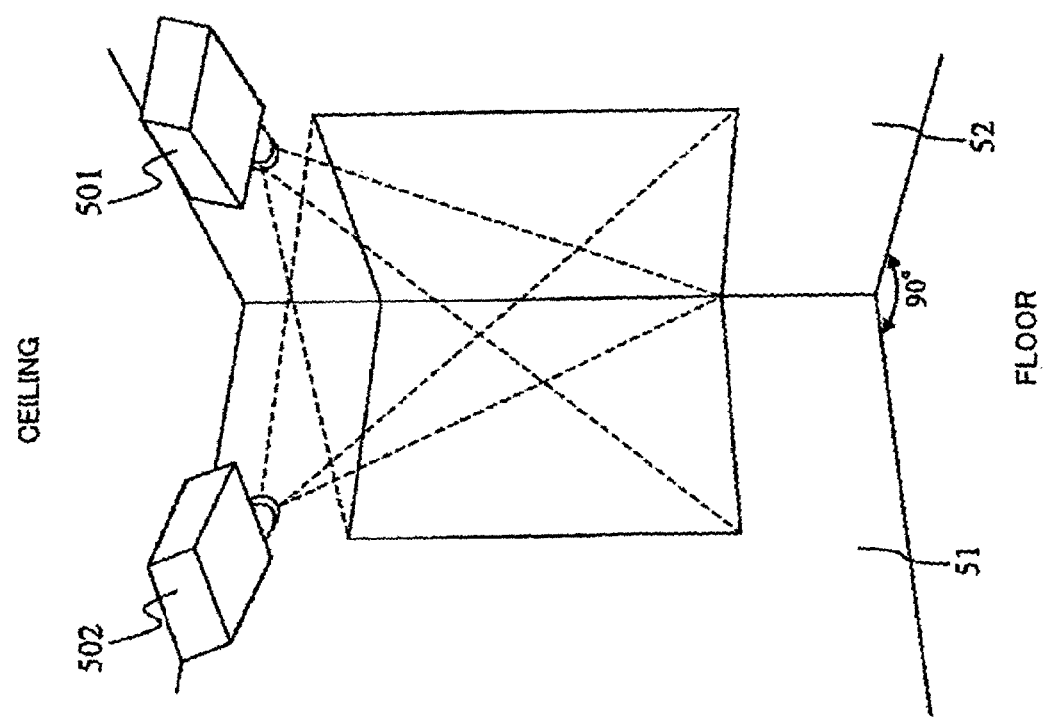
FIG. 12 is an explanatory schematic illustrating an example of projecting the images on two orthogonal inner walls by using two projectors as a specific example of displaying the images on the display surfaces of the polyhedron used in the present invention.

Identical to FIG. 11, in FIG. 12, a joint of two orthogonal inner walls of a conference room is set as a center of a projection screen. The image on the left display surface 11a of FIG. 9 is displayed on the left inner wall 51 of the joint. The image on the right display surface 12a of FIG. 9 is displayed on the right inner wall 52 of the joint. However, as shown in FIG. 12, the images are displayed on the left and right inner walls 51 and 52 by using two projectors 501 and 502. Here, the projector 501 displays the image on the left inner wall 51, and the projector 502 displays the image on the right inner wall 52.

In FIGS. 11 and 12, when the viewpoint is positioned toward the joint of the two inner walls 51 and 52, or the whole image displayed on the inner walls 51 and 52 is seen, or rotated to the right and left directions by 45 degrees from the viewpoint position to see the display surfaces in the orthogonal direction, the images having natural vanishing points like a real object can be seen. As a result, the cubic images having a wide viewing angle range are displayed on the small display screen and appear realistic.

In addition, when the images are displayed by using the one projector 501, the image generation process must be performed in consideration of distortion. However, it is sufficiently advantageous to use only one projector. On the other hand, when two projectors 502 and 503 are used, the images can be projected to form an optical axis positioned in the orthogonal direction to each of the inner walls 51 and 52. Accordingly, the image generating device 41 can perform a simple image generation process without considering distortion.

The process for projecting the images by using one or more projectors on the two orthogonal inner walls 51 and 52 was explained with reference to FIGS. 11 and 12. However, in the same manner, the images can be projected on three orthogonal inner walls by using one or more projector.

Figure 13:
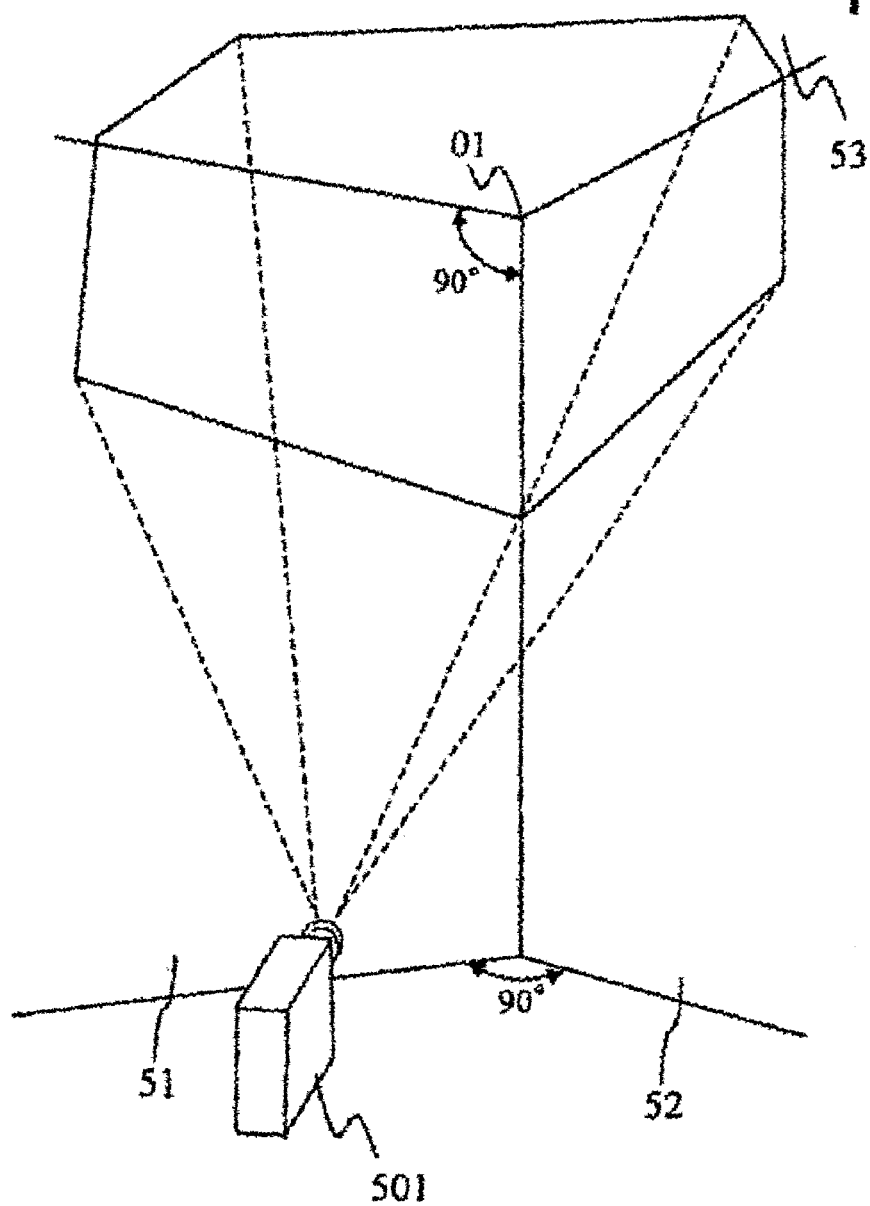
FIG. 13 is an explanatory schematic illustrating an example of projecting the images on three orthogonal inner walls by using one projector as a specific example of displaying the images on the display surfaces of the polyhedron used in the present invention.
Figure 14:
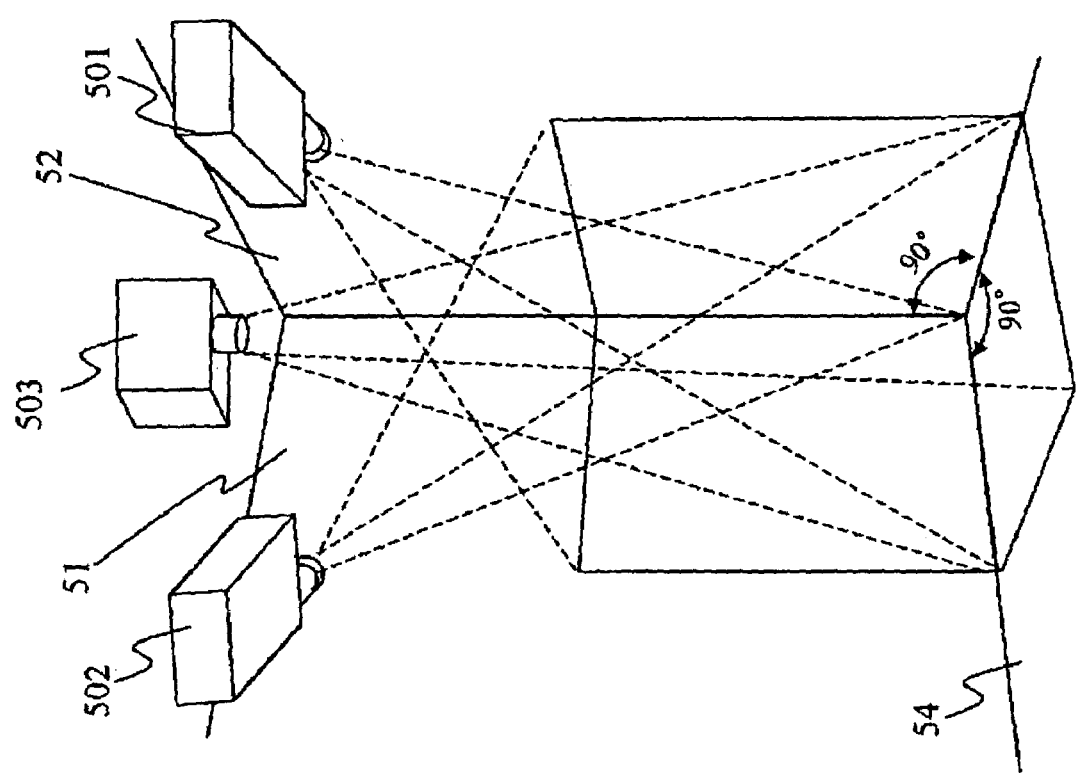
FIG. 14 is an explanatory schematic illustrating an example of projecting the images on three orthogonal inner walls by using three projectors as a specific example of displaying of the images on the display surfaces of the polyhedron used in the present invention.

FIGS. 13 and 14 show examples of displaying the images on the three inner walls. As illustrated in FIG. 13, images are projected on the two orthogonal inner walls 51 and 52 and on a horizontal inner wall, (ceiling surface 53) orthogonal to the inner walls 51 and 52, by using one projector 501. In this case, guide marking is performed to recognize the center of the projection surface from the projector 501. When the images are projected, the center is positioned on an intersection point O1 of the joint of the three inner walls 51, 52 and 53.

In the case where the images are projected by using one projector 501, the shape of the projection surfaces of the inner walls 51, 52 and 53 becomes distorted. However, the outline of the entire projection surfaces can be formed in an elliptical shape, and the outside thereof can be darkened.

As depicted in FIG. 14, images are projected on the two orthogonal inner walls 51 and 52 and a horizontal inner wall, (referred to as floor surface 54 in this embodiment) orthogonal to the inner walls 51 and 52, by using three projectors 501, 502 and 503. In this case, the projector 501 projects the image displayed on the left side wall 51. The projector 502 projects the image displayed on the right side wall 52. The projector 503 projects the image displayed on the floor surface 54. The images are displayed on the three inner walls 51, 52 and 54 by using the three projectors 501, 502 and 503.

As described above, since the images are projected by using the three orthogonal inner walls, the images having vanishing points can be displayed on each inner wall. As a result, the cubic images having wide viewing angle ranges are displayed on the small display surfaces and appear realistic.

The process for displaying the images on the two orthogonal inner walls 51 and 52, or three orthogonal inner walls 51, 52 and 53, or three orthogonal inner walls 51, 52 and 54, by using one or more projector was explained above. Instead of using projectors, the inner walls 51, 52, 53 and 54 can be formed as display surfaces displaying images (for example, liquid crystal display surface or CRT display surface), so that the images can be displayed on the liquid crystal display screens or CRT display screens. In addition, when the images are projected by the projectors, screens can be used as the projection surfaces instead of the inner walls.

Figure 15:
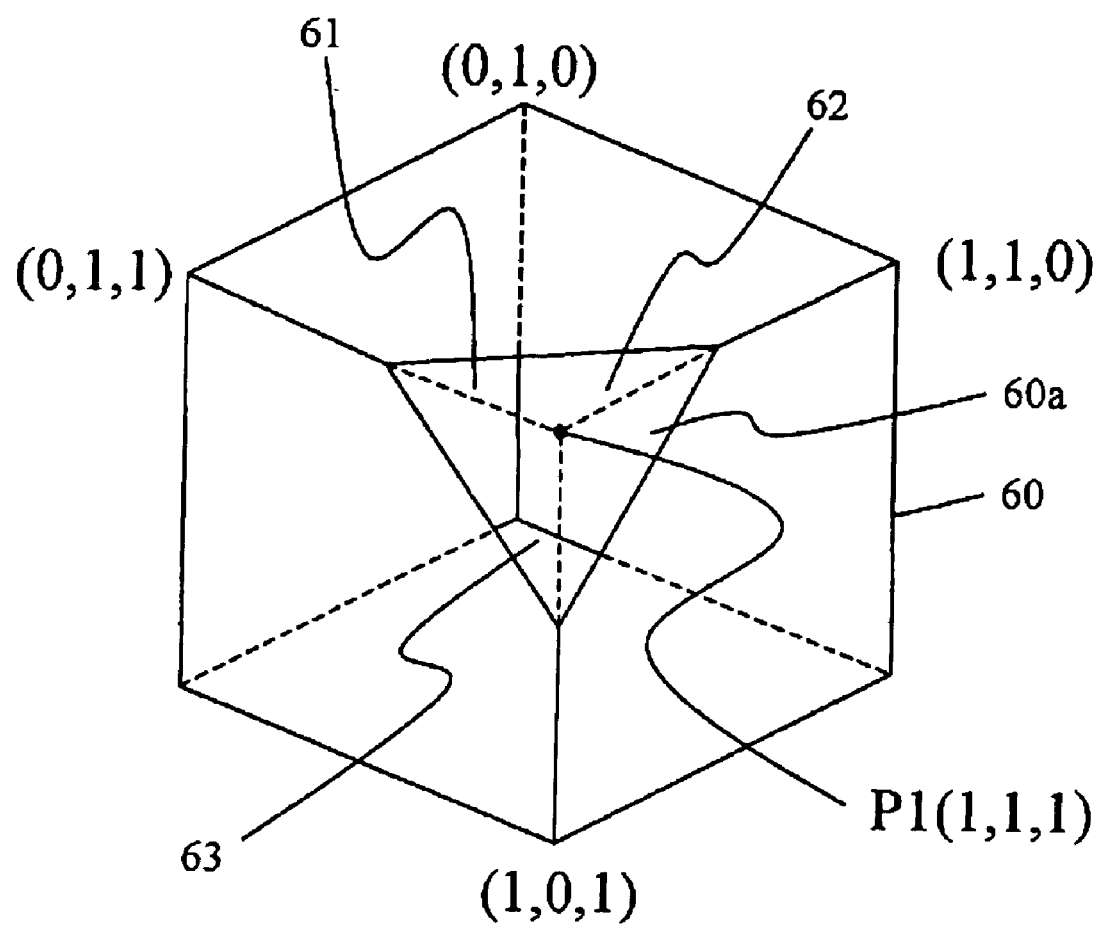
FIG. 15 is an explanatory schematic of an image display device using three orthogonal display surfaces inside a cube.

As an application example of the image display method using three orthogonal display surfaces (inner walls of the conference room in the above embodiments), images can be displayed by using three inside orthogonal surfaces of a cube 60 shown in FIG. 15 as display surfaces.

In consideration of the three-dimensional coordinates of x, y and z of FIG. 16, the cube 60 of FIG. 15 uses an inner wall 61 on an yz-plane surrounded by coordinates (0, 0, 0), (0, 1, 0), (0, 1, 1) and (0, 0, 1), an inner wall 62 on an xy-plane surrounded by coordinates (0, 0, 0), (0, 1, 0), (1, 1, 0) and (1, 0, 0), and an inner wall 63 on an xz-plane surrounded by coordinates (0, 0, 0), (1, 0, 0), (1, 0, 1) and (0, 0, 1) as three display surfaces (hereinafter, referred to as display surfaces 61, 62, 63). In regard to the images displayed on the three display surfaces 61, 62 and 63, the coordinates (1, 1, 1) is set as the viewpoint P1, and the inside of the cube 60 is seen from the viewpoint P1.

As shown in FIG. 15, a periphery of cube 60 is notched to form a triangle at the coordinates (1, 1, 1). The notched part is determined as an inner viewing window 60a for viewing the inside of the cube 60, and the coordinates (1, 1, 1) of the inner viewing window 60a are set as a viewpoint P1, so that the inside of the cube 60 can be seen from the viewpoint P1. The inner viewing window 60a need not to be a triangle. It can be in a circular or elliptical shape.

The images are displayed on the three inner display surfaces 61, 62 and 63 of the cube 60 to respectively have one vanishing point by using the one-point perspective method. The vanishing points are the coordinates (0, 1, 1) of the display surface 61, the coordinates (1, 1, 0) of the display surface 62 and the coordinates (1, 0, 1) of the display surface 63.

A process for displaying one cube 70 as images by using the three display surfaces 61, 62 and 63 will now be explained.

Figure 17:
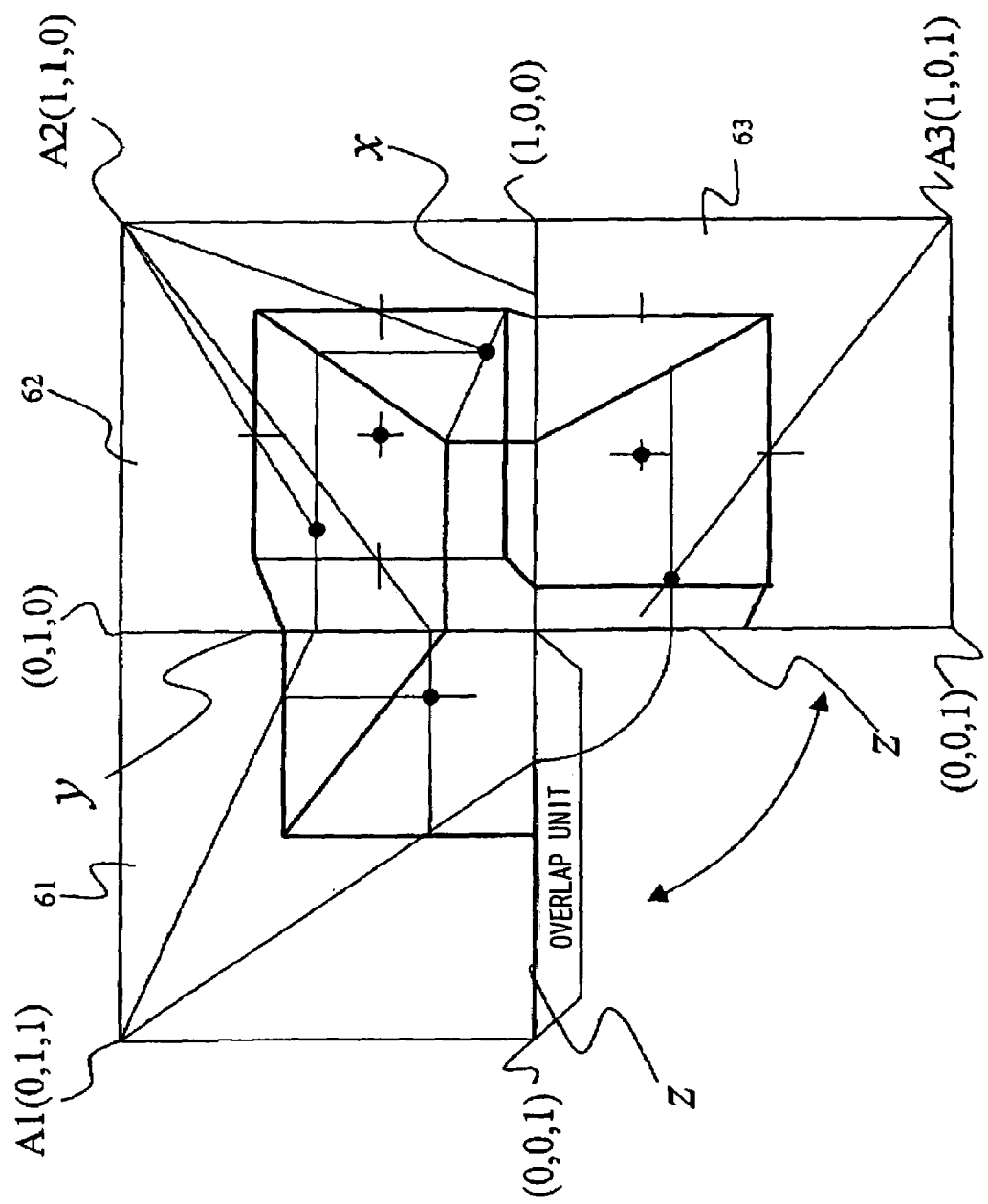
FIG. 17 is a development schematic illustrating an image displayed on the three orthogonal display surfaces of the cube of FIG. 15.

FIG. 17 is a development schematic illustrating the three orthogonal display surfaces 61, 62 and 63 of FIG. 15. Sides of the cube 70 as images are displayed on each of the display surfaces 61, 62 and 63 as images by using the one-point perspective method. As described above, the vanishing point A1 of the display surface 61 is represented by the coordinates (0, 1, 1). The vanishing point A2 of the display surface 62 is represented by the coordinates (1, 1, 0). The vanishing point A3 of the display surface 63 is represented by the coordinates (1, 0, 1).

As described above, with regard to the images displayed on the display surfaces 61, 62, and 63, the computer can calculate which images are suitable for the respective display surfaces 61, 62 and 63, when given the information on coordinates, positions of vanishing points or perspective methods. In this case, the images are displayed on each of the display surfaces 61, 62 and 63 as shown in FIG. 17.

Figure 16:
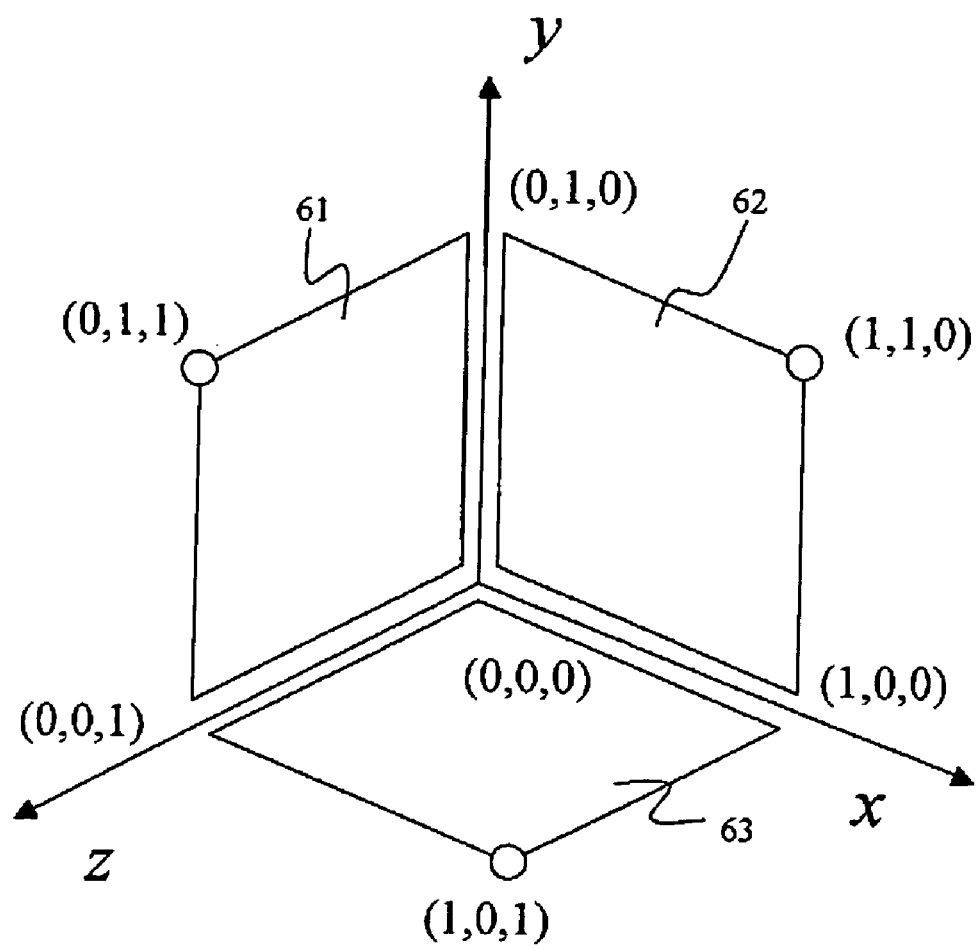
FIG. 16 is an explanatory schematic illustrating the three display surfaces orthogonal each other in the cube of FIG. 15 on three-directional coordinates.
Figure 18:
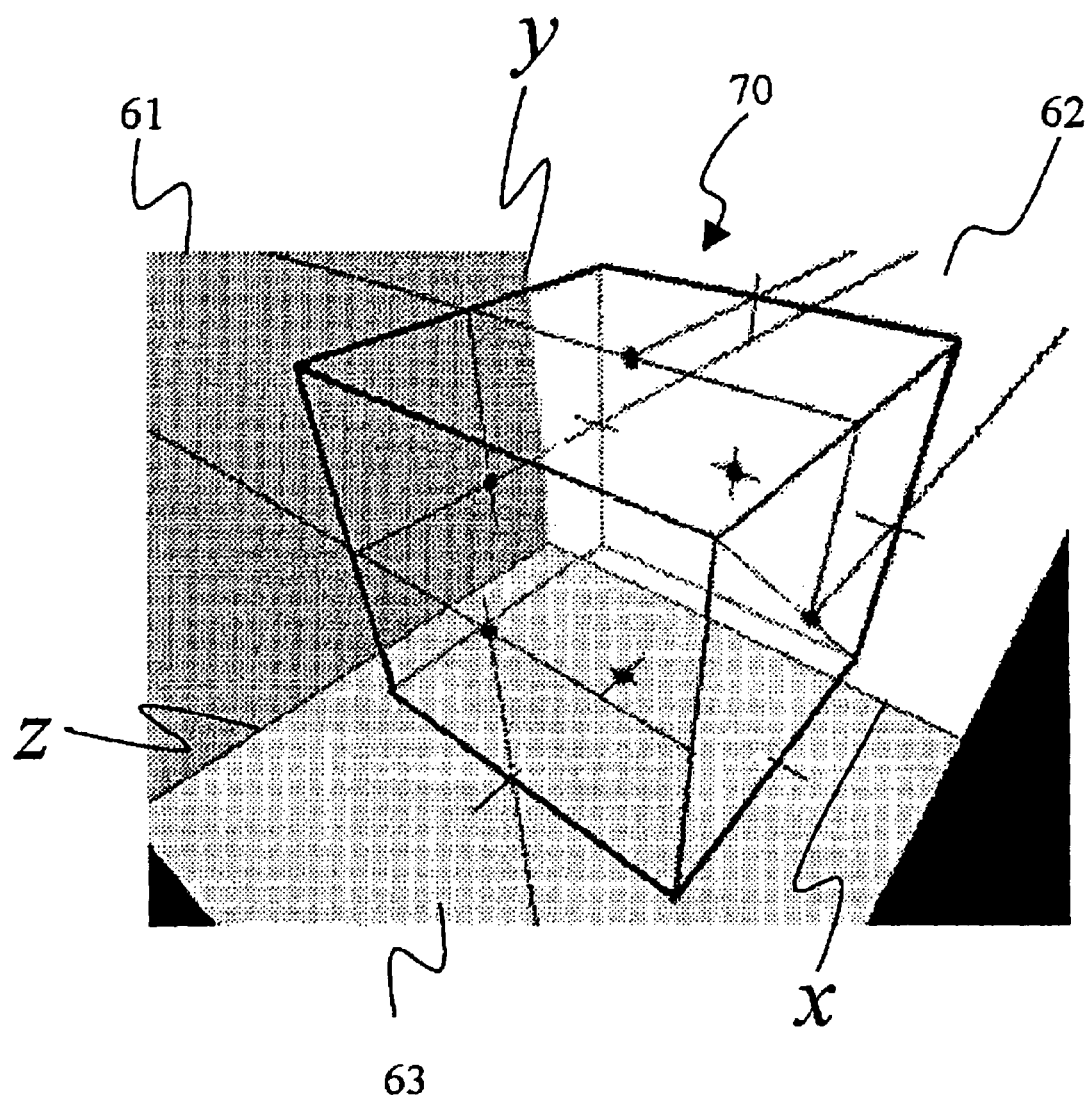
FIG. 18 is a schematic illustrating images seen from coordinates (1, 1, 1) of the cube of FIG. 16, namely an intersection point of the three horizontal and vertical sides extended on an inner viewing window.

Referring to FIG. 17, when lines indicating the joints of the display surfaces 61, 62 and 63 (the lines are represented by x, y and z lines, x line corresponds to x axis of FIG. 16, y line corresponds to y axis of FIG. 16, and z line corresponds to z axis of FIG. 16) are folded at 90 degrees, and when the z line of the display surface 61 and the z line of the display surface 63 overlap with the display surface 63 by an overlap unit formed on the display surface 61 to make the Z line commonly used therebetween, the three inner orthogonal display surfaces 61, 62 and 63 of the cube 60 of FIG. 15 are formed. When the inside of the cube 60 is seen from the coordinates (1, 1, 1) of the cube 60, namely the viewpoint P1 of the inner viewing window 60a, the images (in this case, cube 70) displayed by using the three-point perspective method are seen on the three orthogonal display surfaces 61, 62 and 63 as shown in FIG. 18.

That is, the cube 70 includes vanishing points on each of the display surfaces 61, 62 and 63 (vanishing point A1 on the display surface 61, vanishing point A2 on the display surface 62, and vanishing point A3 on the display surface 63). When the three display surfaces 61, 62 and 63 are seen from the coordinates (1, 1, 1) which indicate the viewpoint P1 of the inner viewing window 60a, the cubic images having wide viewing angle ranges are seen with the vanishing points A1, A2 and A3 in the right and left direction and downward direction. In addition, when the display surfaces 61, 62 and 63 are individually seen, the images having vanishing points in natural directions appear realistic.

Figure 19:
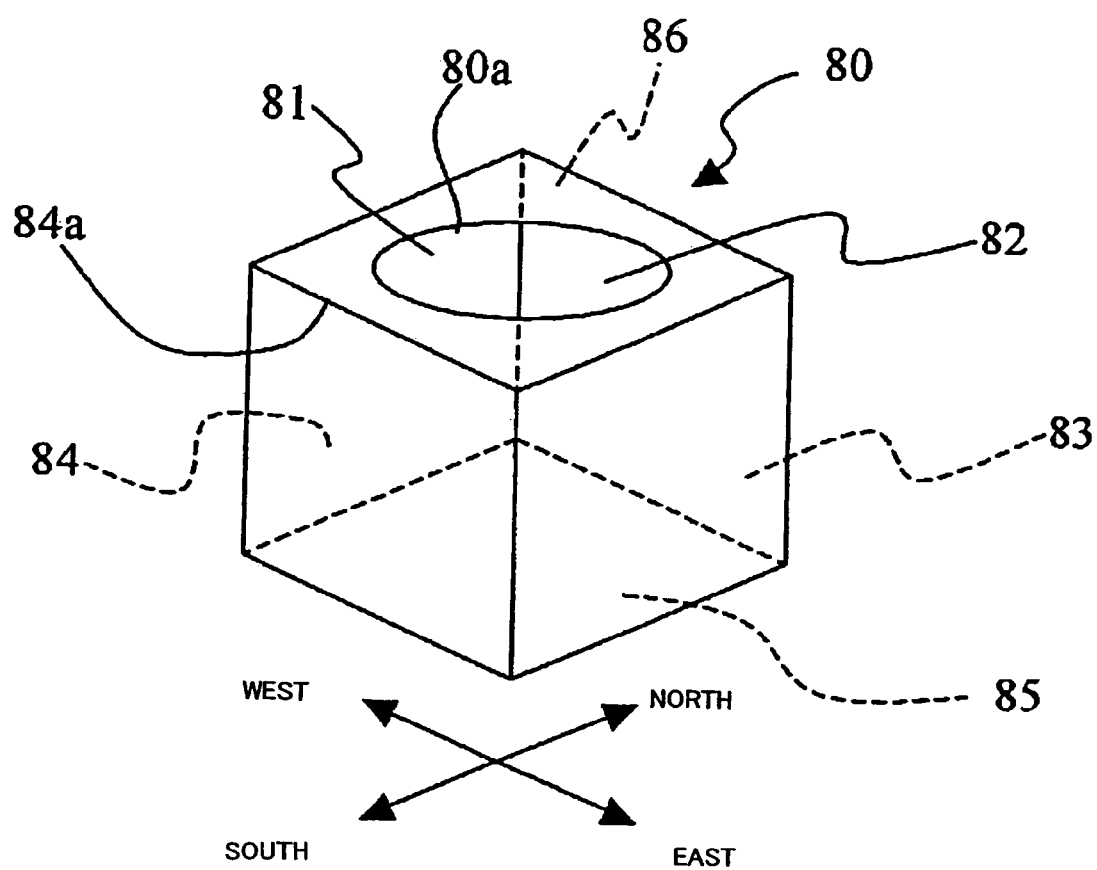
FIG. 19 is an explanatory schematic illustrating a state where an inner viewing window is provided in one surface of the cube, and images are displayed on the five display surfaces other than the surface where the inner viewing window is provided to have one vanishing point on each display surface.

As described above, the images are displayed to have vanishing points A1, A2 and A3 on the three display surface 61, 62, and 63 respectively, by using the three orthogonal display surfaces 61, 62 and 63. However, it is possible to increase the number of display surfaces. For example, as shown in FIG. 19, an inner viewing window 80a is provided on one surface 86 of a cube 80. Five inner surfaces, except for the surface 86, in which the inner viewing window 80a present, are used as display surfaces 81, 82, 83, 84 and 85. Images are displayed to have one vanishing point on each of the display surfaces 81, 82, 83, 84 and 85 respectively.

Figure 20:
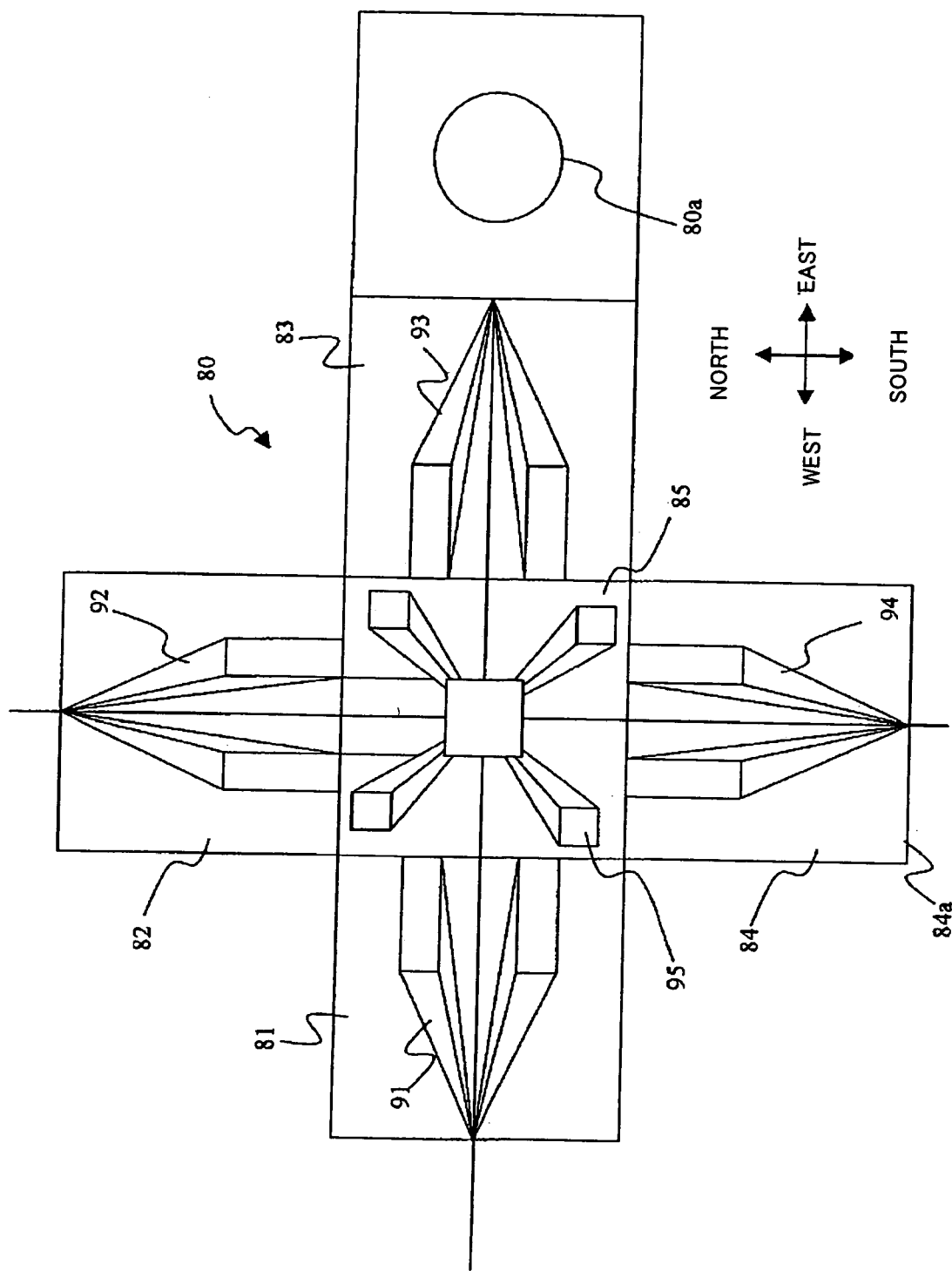
FIG. 20 is a development schematic illustrating display of images on the five display surfaces of the cube of FIG. 19.

FIG. 20 is a development schematic illustrating the images displayed on the five display surfaces 81, 82, 83, 84 and 85 of the cube 80 of FIG. 19, showing the examples of the images displayed on each of the display surfaces 81, 82, 83, 84 and 85. As shown in FIG. 20, the five display surfaces 81, 82, 83, 84 and 85 respectively have vanishing points.

Still referring to FIG. 20, the joints of the adjacent display surfaces 81, 82, 83, 84 and 85 are folded at 90 degrees to form the cube of FIG. 19. The user carries the cube 80 with his/her hands, and sees the inside of the cube 80 from the viewpoint set on the inner viewing window 80a provided on the upper surface (viewpoint is a center of the inner viewing window 80a on the same plane as the upper end of the cube). Accordingly, geometrical shapes 91, 92, 93 and 94 extending in the east, west, south and north directions, are displayed on each of the display surfaces 81, 82, 83, 84 and 85 with appropriate perspective. In addition, a geometrical shape 95 displayed on the bottom surface (display surface 85) shows appropriate perspective in the up/down direction.

FIGS. 21 to 24 illustrate an example of a view when the user carries the cube 80 with his/her hands and sees the inside of the cube 80 from the inner viewing window 80a, namely when a position of the viewpoint variously changes.

Figure 21:
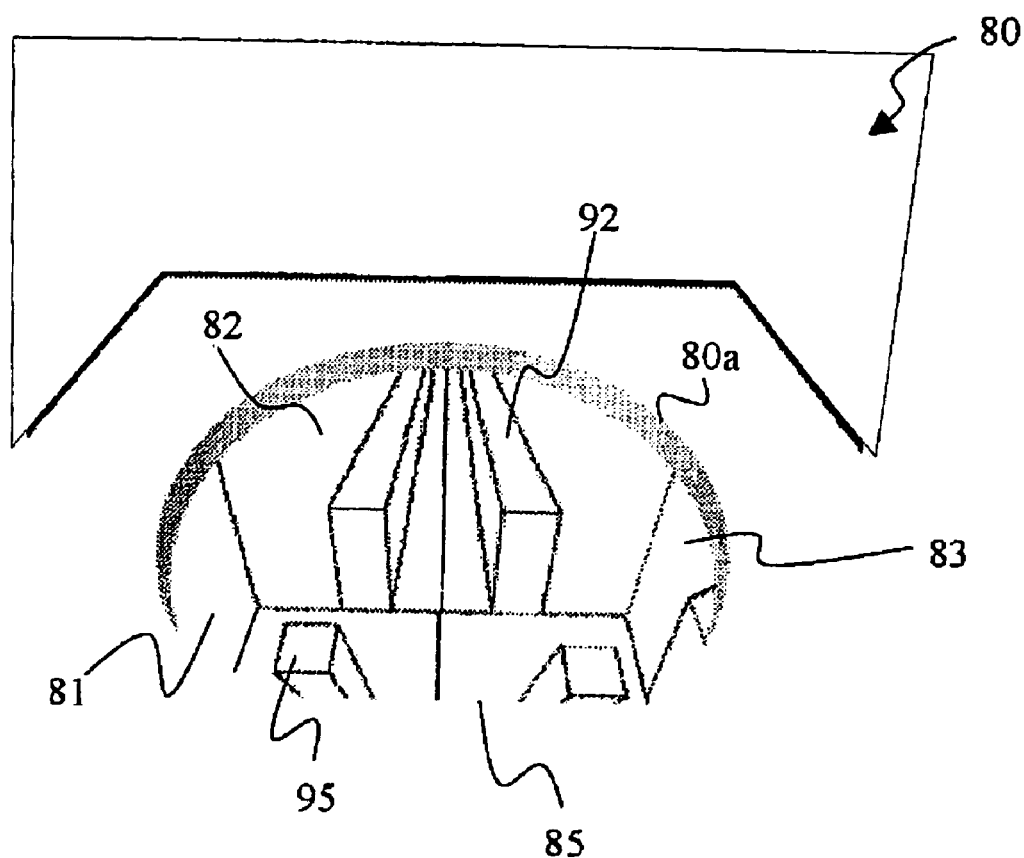
FIG. 21 is an exemplary schematic illustrating an image view when the inside of the cube of FIG. 19 is seen from various viewpoints, by setting the viewpoint at the center and higher than a certain upper end of the cube.

As depicted in FIG. 21, the viewpoint is set at the center and higher than an upper side 84a of the display surface 84 of the cube 80 (refer to FIGS. 19 and 20), and the inside of the cube 80 is seen from the inner viewing window 80a. The geometric shape 92 displayed on the display surface 82 is shown as if it was extended in the viewpoint direction.

Figure 22:
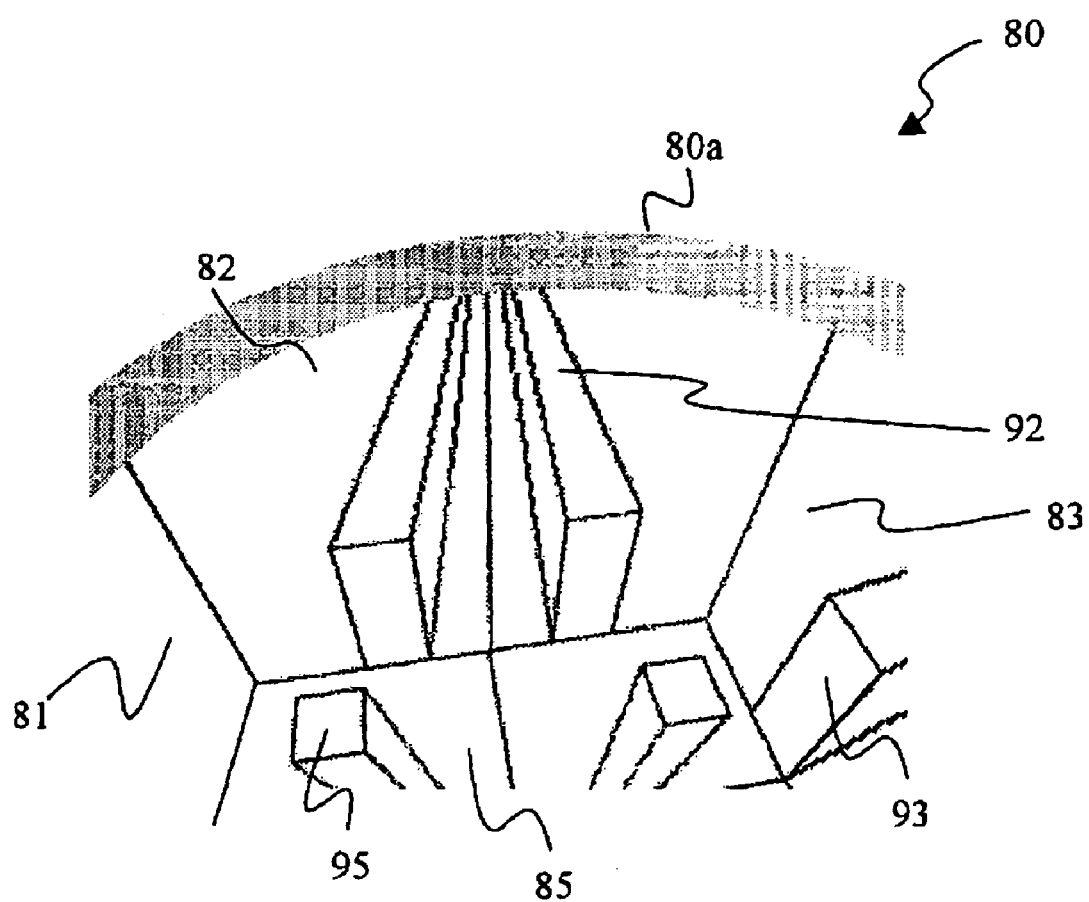
FIG. 22 is a schematic illustrating the inside of the cube when the cube of FIG. 21 is slightly rotated in the left directions and the viewpoint is approaching the inner viewing window further than FIG. 21.

As shown in FIG. 22, when the cube 80 is slightly rotated in the left direction from the state of FIG. 21 and a viewpoint approaches the inner viewing window 80a more than that of FIG. 21, the inside of the cube 80 is seen from the inner viewing window 80a. The geometric shape 92 displayed on the display surface 82 is shown as if it was extended in the upper left direction from the viewpoint direction, and the geometric shape 93 displayed on the display surface 83 is partially seen.

Figure 23:
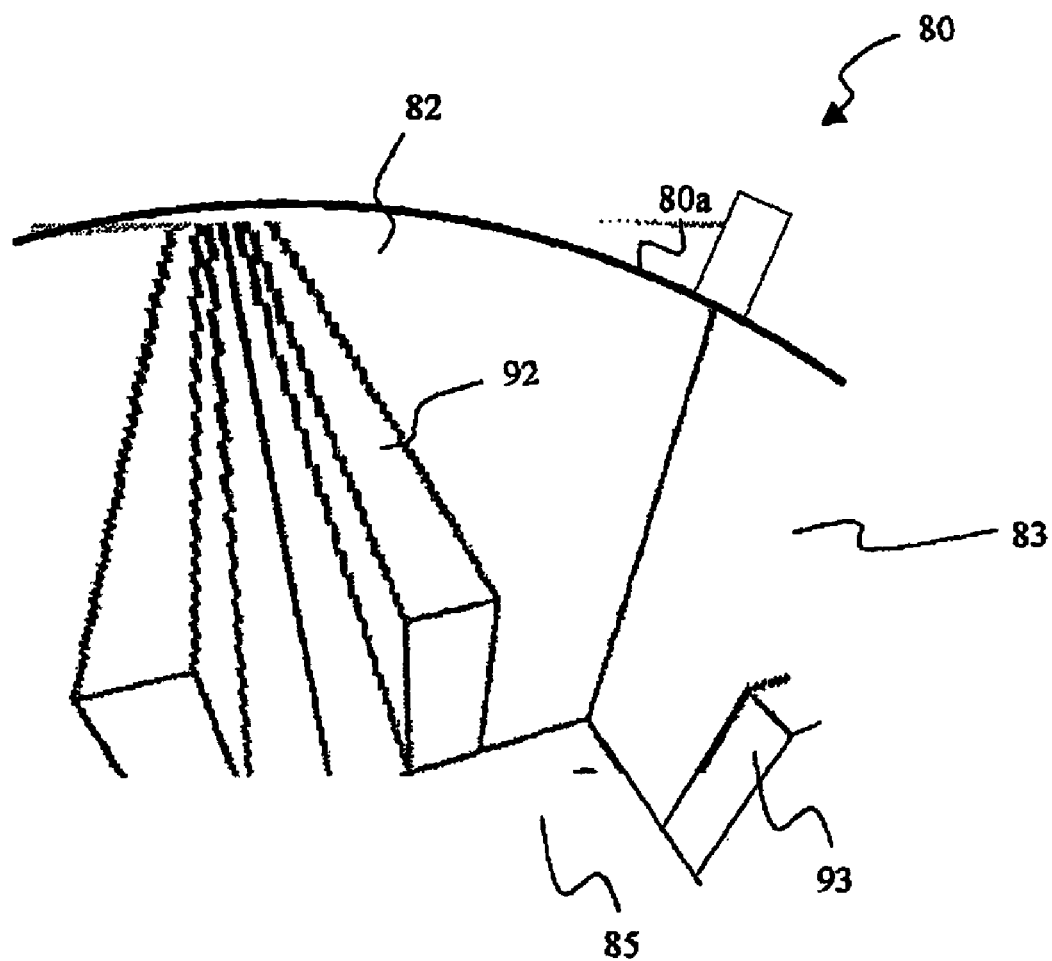
FIG. 23 is a schematic illustrating the inside of the cube when the viewpoint is approaching the inner viewing window further than FIG. 22.

As illustrated in FIG. 23, when the viewpoint approaches the inner viewing window 80a more than that of FIG. 22, the inside of the cube 80 is seen from the inner viewing window 80a. The geometric shape 92 displayed on the display surface 82 is shown as if it was extended further in the depth direction than that of FIG. 22.

Figure 24:
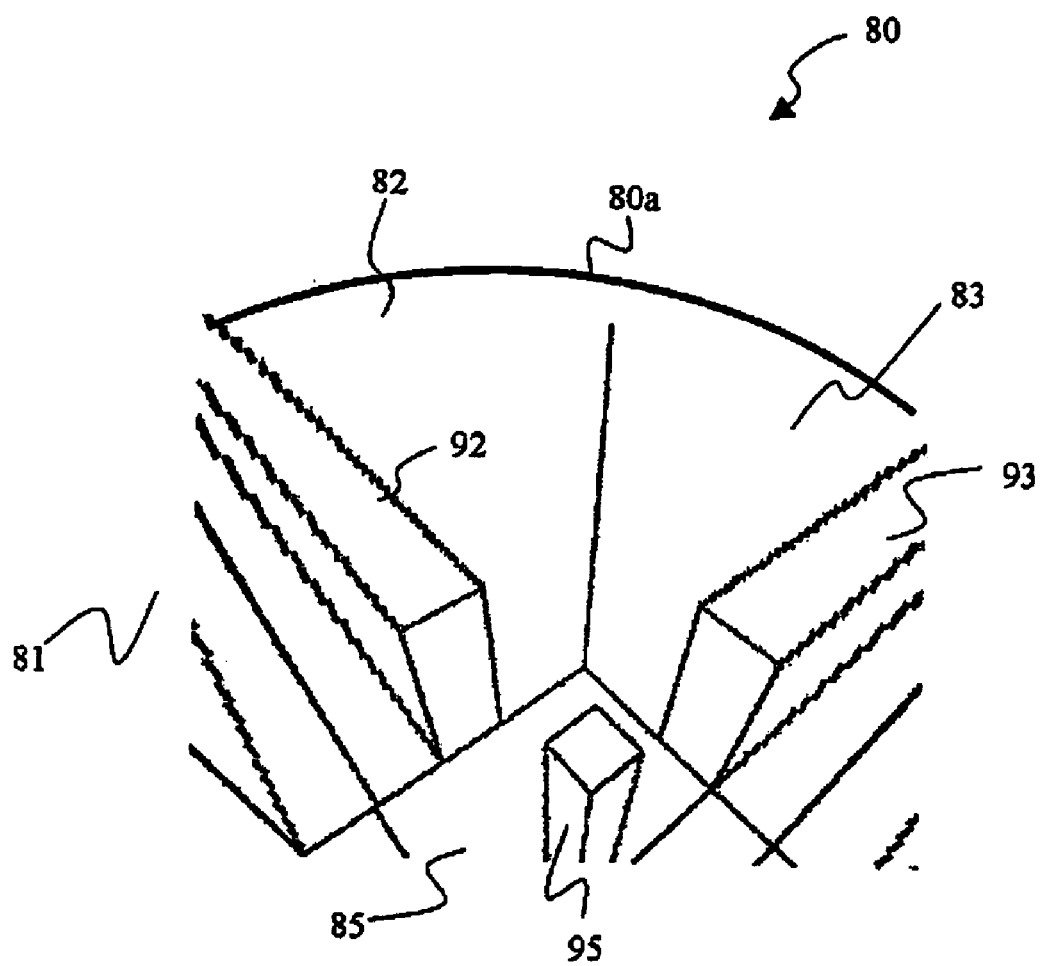
FIG. 24 is a schematic illustrating the inside of the cube when the cube of FIG. 23 is slightly rotated in the left direction.

Referring to FIG. 24, when the cube 80 is slightly rotated in the left direction from the state of FIG. 23, the inside of the cube 80 is seen. The geometric shape 92 displayed on the display surface 82 and the geometric shape 93 displayed on the displays surface 83 are shown as if they extended in the upper right and left directions at about 45 degree from the viewpoint direction.

As described above, when the images are displayed to have one vanishing point on each of the plural display surfaces (in the above embodiment, five display surfaces 81, 82, 83, 84 and 85), two or three orthogonal display surfaces are used. However, liquid crystal screens or CRT display screens can be used as display surfaces. In this case, images can be projected on each display surface by using a projector.

In addition, the cube 80 having the plurality of display surfaces (in the above embodiment, five display surfaces) can be large enough for the user to enter. When the user enters the cube 80, if the images of FIG. 19 are projected on the five inner walls (five display surfaces 81, 82, 83, 84 and 85) by using, for example, five projectors, the user sees the display surfaces 81, 82, 83, 84 and 85 from the predetermined viewpoint. Therefore, the user can feel like being in a real object.

When the cube 80 is portable, the user sees the inside of the cube 80 from the viewpoint set on the inner viewing window 80a. Herein, the images having the wide viewing angle range and a cubic effect are displayed. Therefore, the user can feel like being in a real scene. Various applications of the image display device such as a portable game set are expected.

Although the preferred exemplary embodiments of the present invention have been described, it is understood that the present invention should not be limited to these preferred exemplary embodiments and that various changes and modifications can be made by one skilled in the art within the spirit and scope of the present invention as hereinafter claimed. For example, in the above exemplary embodiments, the plurality of display surfaces displaying images are orthogonal display surfaces. However, surfaces having an angle less than 180 degrees between each other can be freely used. Curved surfaces can also be used.

In accordance with the present invention, a processing program including a processing order of the invention can be prepared and recorded on a recording medium such as a floppy disk, an optical disk and a hard disk. The present invention includes the recording medium on which the processing program has been recorded. The processing program can be obtained from a network.

[Advantages]

As discussed earlier, in accordance with the present invention, the image display method for displaying images on the plurality of display surfaces, which are inner surfaces of the polyhedron, calculates how the images will be displayed on each display surface when seen from a specific viewpoint, and displays the obtained images on each display surface. Accordingly, the images having a wide viewing angle range and a cubic effect with actuality or reality thereto can be displayed even on the small display surfaces.

The real images, such as DVD will have the wide viewing angle range and a cubic effect providing actuality or reality thereto and be displayed even on the small display surfaces. In addition, the three-dimensional computer graphic images will be displayed with natural vanishing points like a real object on the small display surfaces. As a result, the images are displayed with the wide viewing angle range and a cubic effect. Even if the viewpoint of the user changes, the images are displayed with natural perspective without revealing any incongruity.

The examples in which plurality of inner surfaces of the polyhedron are used as display surfaces include the use of the space which is not suitable for image display such as corners of a room whose indoor walls are orthogonal (including ceiling and floor), or at least two adjacent inner walls of a box like a cube. Therefore, when the images are displayed on the plurality of walls of a small room, a person inside the room can see the images displayed on the walls with a wide viewing angle range and a cubic effect from a specific viewpoint. Thus, he/she feels like being in a real space.

In addition, the polyhedron is in a shape of box. The inner surfaces of the box are used as display surfaces. The inner viewing window is provided in the box. The specific viewpoint is set on the inner viewing window. Accordingly, the user can see the inner display surfaces from the viewpoint through the inner viewing window. Moreover, if the box is portable such that the user carries and sees the inside of the box from a predetermined viewpoint, he/she can see the cubic images in the wide viewing angle range. Accordingly, the user feels like being in a real space. Various applications of the image display device such as a portable game set are expected.

What is claimed is:

1. An image display method to display images on a plurality of display surfaces by using a plurality of inner surfaces of a polyhedron as the display surfaces, the image display method comprising:
   dividing an image to be displayed in accordance with plurality of display surfaces;
   generating a plurality of images for the plurality of display surfaces so that the plurality of divided images are expressed by using a perspective method having a different vanishing point for each of the plurality of display surfaces; and
   displaying the generated images on the plurality of display surfaces.

2. The image display method according to claim 1, wherein if the images to be displayed are real images, the real images projected on a two-dimensional display surface are converted to at least two adjacent display surfaces of the plurality of display surfaces forming the polyhedron.

3. The image display method according to claim 1, wherein the images to be displayed are three-dimensional computer graphic images, and the process by which the images are divided in accordance with the plurality of display surfaces is a process that divides the three-dimensional computer graphic images in accordance with at least two adjacent display surfaces of the plurality of display surfaces forming the polyhedron.

4. The image display method according to claim 1, the at least two adjacent display surfaces of the plurality of surfaces forming the polyhedron are orthogonal to each other.

5. The image display method according to claim 4, the at least two adjacent display surfaces, which are orthogonal to each other, comprise a combination of vertical display surfaces and horizontal display surfaces.

6. The image display method according to claim 1, the displaying of the images on the plurality of display surfaces, uses as display screens, image display screens of an image display device having an image display function, and displays the images on the plurality of display surfaces using the image display screens of the image display device.

7. The image display method according to claim 1, the displaying of the images on the plurality of display surfaces uses at least one image display device to project the images on image projection surfaces, and displays the images on the plurality of display surfaces by the at least one image display device, the image display device using the display surfaces as the image projection surfaces.

8. The image display method according to claim 1, forming the polyhedron in a box shape, the inner surfaces of the box are used as the display surfaces; and forming an inner viewing window, to view the inside of the box, in the box, the specific viewpoint is set in the inner viewing window.

9. An image display device to display images on a plurality of display surfaces by using a plurality of inner surfaces of a polyhedron as the display surfaces, the image display device comprising:
   an image dividing device to divide an image to be displayed in accordance with the plurality of display surfaces;
   an image generating device to generate a plurality of images for the plurality of display surfaces so that a plurality of divided images are expressed by using a perspective method having a different vanishing point for each of the plurality of display surfaces; and
   an image display device to display the images obtained by the image processing device on each of the display surfaces.

10. The image display device according to claim 9, if the images to be displayed are real images, the real images projected on a two-dimensional display surface are converted to at least two adjacent display surfaces of the plurality of display surfaces forming the polyhedron.

11. The image display device according to claim 9, if the images to be displayed are three-dimensional computer graphic images, the image dividing device divides the three-dimensional computer graphic images in accordance with at least two adjacent display surfaces of the plurality of display surfaces forming the polyhedron.

12. The image display device according to claim 9, the at least two adjacent display surfaces of the plurality of surfaces forming the polyhedron being orthogonal to each other.

13. The image display device according to claim 12, the at least two adjacent display surfaces which are orthogonal to each other comprise combinations of vertical display surfaces and horizontal display surfaces.

14. The image display device according to claim 9, the images are displayed on the plurality of display surfaces by image display screens of the image display device and the image display screens of the image display device having an image display function are used as display screens.

15. The image display device according to claim 9, the images are displayed on the plurality of display surfaces by using at least one image display device, and the at least one image display device projecting the images on image projection surfaces by using the display surfaces as the image projection surfaces.

16. The image display device according to claim 9, the polyhedron is formed in a box shape, the inner surfaces of the box are used as the display surfaces, an inner viewing window to view the inside of the box is formed in the box, and the specific viewpoint is set in the inner viewing window.

17. An image display method to display images on n display surfaces by using n inner surfaces of a polyhedron as the display surfaces, the image display method comprising:

obtaining how a plurality of divided images are displayed on each of the n display surfaces so that the images become images that are expressed by a m-point perspective method having m different vanishing points wherein when viewing the images to be displayed from a specific viewpoint wherein; $n \geq m > 1$ and displaying the obtained images on each of the n display surfaces.

18. An image display device to display images on n display surfaces by using n inner surfaces of a polyhedron as the display surfaces, the image display device comprising:

an image obtaining device to obtain how a plurality of images are displayed on the n display surfaces so that the images become images that are expressed by a m-point perspective method having m different vanishing points when viewing the images to be displayed from a specific viewpoint wherein $n \geq m > 1$; and an image display device to display the images obtained by the image obtaining device on each of the n display surfaces.

* * * * *